United States Patent

Goel

Patent Number: 6,057,848
Date of Patent: May 2, 2000

[54] SYSTEM FOR RENDERING HIGH ORDER RATIONAL SURFACE PATCHES

[75] Inventor: Vineet Goel, Santa Clara, Calif.

[73] Assignee: LSI Logic Corporation, Milpitas, Calif.

[21] Appl. No.: 08/921,916

[22] Filed: Aug. 27, 1997

Related U.S. Application Data

[63] Continuation-in-part of application No. 08/835,501, Apr. 8, 1997.

[51] Int. Cl.[7] .................................................... G06F 15/00
[52] U.S. Cl. ........................................... 345/423; 345/434
[58] Field of Search .................................. 345/420, 423, 345/434, 433

[56] References Cited

U.S. PATENT DOCUMENTS 5,377,320  12/1994  Abi-Ezzi et al. .................... 345/423 X

*Primary Examiner*—Mark R. Powell
*Assistant Examiner*—Chanté Harrison
*Attorney, Agent, or Firm*—Conley, Rose & Tayon, PC; B. Noel Kivlin

[57] ABSTRACT

A high order surface patch rendering system. A patch is rendered by subdividing a patch until the subpatches are sufficiently flat that they can be approximated by a quadrilateral, which can then be split diagonally and written to a rasterizer in the form of two triangles. In one embodiment, the patch rendering system receives rational coordinates (X,Y,Z,W) and attribute coordinates (color, opacity, texture) of control points of the Bezier surface patch. The patch rendering system divides and subdivides the surface patch by operating on the surface patch control points to produce subpatch control points. The rational coordinates of the control points are converted to spatial coordinates, and if the current subpatch is determined to be flat, the spatial coordinates and attributes of the subpatch corner points are provided to an output buffer in the form of triangle vertices with associated attributes. The patch rendering system which includes a patch tessellation device for converting a Bezier surface patch having a set of control points to a plurality of triangles for display. The patch tessellation device comprises a patch buffer, a patch division unit, a homogeneous coordinate unit, and a corner unit. The patch buffer is configured to receive and store rational coordinates of current control points of a current surface patch. The patch division unit is coupled to receive the rational coordinates of the current control points from the patch buffer and configured to calculate rational coordinates of new control points for a new surface patch. The homogeneous coordinate unit is coupled to receive the rational coordinates of the new control points and configured to convert the rational coordinates of the new control points to spatial coordinates of the new control points. The corner unit is coupled to the homogeneous coordinate unit to receive the spatial coordinates of new control points which correspond to corner points of the new surface patch, and configured to provide the spatial coordinates for corner points of the new surface patch as triangle vertices to an output buffer if the new surface patch is classified as flat. In addition to the coordinates, the patch tessellation device may also operate on Bezier patches specifying attributes of the surface patches.

14 Claims, 17 Drawing Sheets if an edge is linear, corresponding bit is
set to one, otherwise to zero.

| Cycle | stage 1 | stage 2 | stage 3 | stage 4 | stage 5 |
|---|---|---|---|---|---|
| 1 | p(3,0) | | | | |
| 2 | p(3,1) | | | | |
| 3 | p(3,2) | | | | |
| 4 | p(3,3) | | | | |
| 5 | p(0,0) | | | | |
| 6 | p(0,1) | | | | |
| 7 | p(0,2) | | | | |
| 8 | p(0,3) | | | | |
| 9 | p(1,0) | | | | |
| 10 | p(1,1) | p(1,0)-p(0,1) | | | |
| 11 | p(1,2) | p(1,1)-p(0,0),p(1,1)-p(0,2) | | | |
| 12 | p(1,3) | p(1,2)-p(0,1),p(1,2)-p(0,3) | (A,B) = (p(1,0)-p(0,1))*(P(1,1)-P(0,0)) | | |
| 13 | p(2,0) | p(1,3)-p(0,2) | (A,B) = (p(1,1)-p(0,2))*(P(1,2)-P(0,1)) | | |
| 14 | p(2,1) | p(2,0)-p(1,1) | (A,B) = (p(1,2)-p(0,3))*(P(1,3)-P(0,2)) | A-B | |
| 15 | p(2,2) | p(2,1)-p(1,0),p(2,1)-p(1,2) | | A-B | compare |
| 16 | p(2,3) | p(2,2)-p(1,1),p(2,2)-p(1,3) | (A,B) = (p(2,0)-p(1,1))*(P(2,1)-P1,0)) | A-B | compare |
| 17 | | p(2,3)-p(1,2) | (A,B) = (p(2,1)-p(1,2))*(P(2,2)-P(1,1)) | | compare |
| 18 | | p(3,0)-p(2,1) | (A,B) = (p(2,2)-p(1,3))*(P(2,3)-P(1,2)) | A-B | |
| 19 | | p(3,1)-p(2,0),p(3,1)-p(2,2) | | A-B | compare |
| 20 | | p(3,2)-p(2,1),p(3,2)-p(2,3) | (A,B) = (p(3,0)-p(2,1))*(P(3,1)-P(2,0)) | A-B | compare |
| 21 | | p(3,3)-p(2,2) | (A,B) = (p(3,1)-p(2,2))*(P(3,2)-P(2,1)) | | compare |
| 22 | | | (A,B) = (p(3,2)-p(2,3))*(P(3,3)-P(2,2)) | A-B | |
| 23 | | | | A-B | compare |
| 24 | | | | A-B | compare |
| 25 | | | | | compare |

| Cycle | stage 1 | stage 2 | stage 3 | stage 4 | stage 5 |
|---|---|---|---|---|---|
| 1 | A=xe-x0 | | | | |
| 2 | B=ye-y0 | E=(xe-x0)$^2$ | | | |
| 3 | C=ze-z0 | E=(ye-y0)$^2$ | | | |
| 4 | D=x1-x0 | E+=(ze-z0)$^2$ | | | |
| 5 | D=y1-y0 | F=A*D | | | |
| 6 | D=z1-z0 | F+=B*D | 1/E | | |
| 7 | | F+=C*D | | | |
| 8 | | | | D=F*(1/E) | |
| 9 | | | | | |
| 10 | | | | | xm=x0+D*A |
| 11 | | | | | ym=y0+D*B |
| 12 | | | | | zm=z0+D*C |
| 13 | | | | | |

SYSTEM FOR RENDERING HIGH ORDER RATIONAL SURFACE PATCHES

This application is a continuation-in-part of U.S. patent application Ser. No. 08/835,501, filed Apr. 8, 1997, (atty. docket # 5201-05200).

BACKGROUND OF THE INVENTION

1. Field of the Invention

This invention relates to the field of systems for converting object representations to images for graphical display, and in particular to a system for rendering a surface represented by a set of Bezier patches.

2. Description of the Related Art

There is a growing interest in the graphics, vision, and manufacturing communities to be able to acquire and digitally reproduce the shape and external appearance of objects for the purpose of transmission, display, and numerically controlled fabrication. This would have applications in product design, fast prototyping, reverse engineering, and digitizing shapes for the visual simulation, animation, and entertainment industries. Current advancement in laser range scanners now offers a promising methodology for fully-automated model acquisition of arbitrary objects. Several million points scanned on an arbitrary object can be converted easily into an irregular mesh of polygons. These polygons are then preferably converted into a parametric surface representation, which is a more compact and manipulable form. U.S. patent application Ser. No. 08/810,255 (atty. docket # 5201-05100) titled "System and method for parametric surface representation of objects using high order surface patches" filed Mar. 3, 1997, and authored by Nishit Kumar et al. provides a fully automated method for converting a polygonal representation into a set of Bezier patches. A method for rendering these patches is now desirable.

A Bezier patch is a two-dimensional Bezier curve. A Bezier curve is defined by the following equation:

$$Q(s) = \sum_{i=1}^{n} g_i \left( \frac{n!}{i!(n-i)!} \right) s^i (1-s)^{n-i}, \qquad (1)$$

where $g_i$, $0 \leq i \leq n$, are control points as shown in FIG. 1A. The result is a curve that is formed by a weighted sum of the control points. In cubic form, equation (1) can be represented by the following matrix equation:

$$Q(s) = [s^3 \; s^2 \; s \; 1] \begin{bmatrix} -1 & 3 & -3 & 1 \\ 3 & -6 & 3 & 0 \\ -3 & 3 & 0 & 0 \\ 1 & 0 & 0 & 0 \end{bmatrix} \begin{bmatrix} g_0 \\ g_1 \\ g_2 \\ g_3 \end{bmatrix} = S M G_c, \qquad (2)$$

where $G_c$ is a column vector containing the Bezier curve control points. If $G_c$ is parameterized in order to vary as a function of a second coordinate t, this gives the two-dimensional surface:

$$Q(s,t) = S M \begin{bmatrix} G_0(t) \\ G_1(t) \\ G_2(t) \\ G_3(t) \end{bmatrix}. \qquad (3)$$

Realizing that for 3rd order Bezier curves, $G_i(t)$ can be expressed in the matrix equation $$G_i(t) = T M G_{ci}, \qquad (4)$$

an expanded form of equation (3) can be written $$Q(s,t) = S M \begin{bmatrix} g_{00} & g_{01} & g_{02} & g_{03} \\ g_{10} & g_{11} & g_{12} & g_{13} \\ g_{20} & g_{21} & g_{22} & g_{23} \\ g_{30} & g_{31} & g_{32} & g_{33} \end{bmatrix} M^T T^T. \qquad (5)$$

Equation (5) is the matrix form of a bicubic Bezier patch. An example of such a patch is shown in FIG. 1B. Equation (5) is decomposable into three equations of the same form, one equation for each coordinate axis of the control points. For example, equation (5) could be written as $$X(s,t) = S M G_x M T^T, \qquad (6)$$

$$Y(s,t) = S M G_y M T^T, \qquad (7)$$

and $$Z(s,t) = S M G_z M T^T. \qquad (8)$$

A generalization of the Bezier patch referred to as a "rational Bezier patch" is often used. A rational Bezier patch has a fourth equation $$W(s,t) = S M G_w M T^T, \qquad (9)$$

which is used in determining the equation of the points of the surface in the following way: the (x,y,z) points on the surface patch are given by $$\left( \frac{X(s,t)}{W(s,t)}, \frac{Y(s,t)}{W(s,t)}, \frac{Z(s,t)}{W(s,t)} \right) \qquad (10)$$

where $0 \leq s, t \leq 1$.

Three properties of Bezier patches are noted here. A Bezier patch is completely contained within the convex hull formed by the control points which define the patch. One exemplary consequence of this is that it may be determined that a patch is not within the screen boundaries if none of the control points is within the screen boundaries. A desired affine transformation (e.g. rotation, translation, magnification) of a Bezier patch may be achieved by applying the transformation to the control points. An exemplary consequence of this is that the transformation may be applied before the patch is rendered, thereby providing a significant decrease in the associated computation. Finally, an affine transformation may be applied to the s,t parameters of a Bezier patch without inducing any variation in the patch. These three properties will be used in later discussion.

In addition to the surface coordinates of an object, Bezier patches may be used to represent other aspects of the object. Examples include patches which provide values for the normal to the surface (N), the direction of the light source (L), the direction of reflected objects (R), the surface color and opacity of an object (R,G,B,A), and the coordinates of a texture image to be mapped onto the surface (U,V). In addition to these primary attribute patches, secondary attribute patches may also be associated with an object for special effects. All of these attribute patches must be rendered during the rendering of the surface to provide realism and a variety of special effects.

The usage of Bezier patches advantageously provides a method for compact, high-quality representation of objects. This method also allows for efficient execution of affine transformations on the object. It is desirable to have a method for converting Bezier patches into sets of triangles or other polygons for which established graphics rendering, hardware exists.

SUMMARY Of THE INVENTION

The problems outlined above are in large part solved by a high order surface patch rendering system. A patch is rendered by subdividing a patch until the subpatches are sufficiently flat that they can be approximated by a quadrilateral, which can then be split diagonally and written to a rasterizer in the form of two triangles. In one embodiment, the patch rendering system receives rational coordinates (X,Y,Z,W) and attribute coordinates (color, opacity, texture) of control points of the Bezier surface patch. The patch rendering system divides and subdivides the surface patch by operating on the surface patch control points to produce subpatch control points. The rational coordinates of the control points are converted to spatial coordinates, and if the current subpatch is determined to be flat, the spatial coordinates and attributes of the subpatch corner points are provided to an output buffer in the form of triangle vertices with associated attributes.

The present invention contemplates a patch rendering system which includes a patch tessellation device for converting a Bezier surface patch having a set of control points to a plurality of triangles for display. The patch tessellation device comprises a patch buffer, a patch division unit, a homogeneous coordinate unit, and a corner unit. The patch buffer is configured to receive and store rational coordinates of current control points of a current surface patch. The patch division unit is coupled to receive the rational coordinates of the current control points from the patch buffer and configured to calculate rational coordinates of new control points for a new surface patch. The homogeneous coordinate unit is coupled to receive the rational coordinates of the new control points and configured to convert the rational coordinates of the new control points to spatial coordinates of the new control points. The corner unit is coupled to the homogeneous coordinate unit to receive the spatial coordinates of new control points which correspond to corner points of the new surface patch, and configured to provide the spatial coordinates for corner points of the new surface patch as triangle vertices to an output buffer if the new surface patch is classified as flat. In addition to the coordinates, the patch tessellation device may also operate on Bezier patches specifying attributes of the surface patches.

BRIEF DESCRIPTION OF THE DRAWINGS

Other objects and advantages of the invention will become apparent upon reading, the following, detailed description and upon reference to the accompanying drawings in which.

Figure 1A:
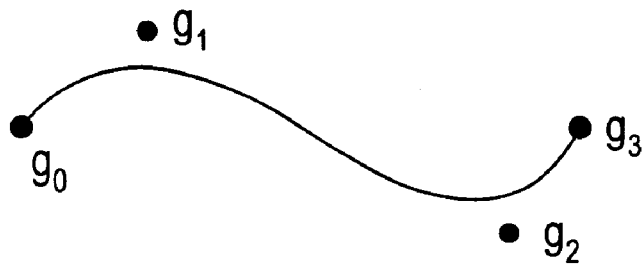
FIG. 1a shows an example of a cubic Bezier curve having four control points.
Figure 1B:
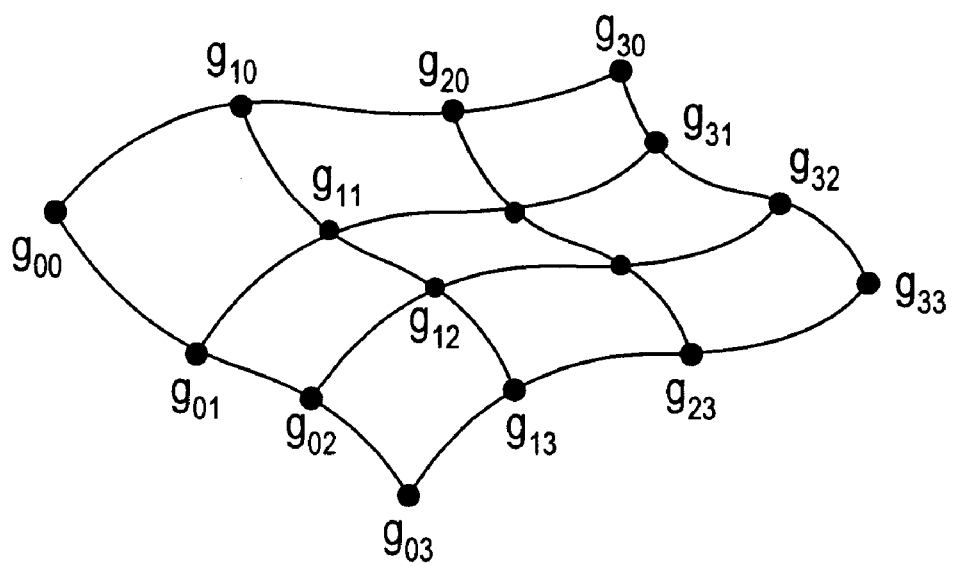
FIG. 1b shows an example of a bicubic Bezier patch having sixteen control points.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following references are hereby incorporated by reference as though entirely and completely set forth herein:

E. Catmull, *A Sub-division algorithm for computer display of curved surface*, Computer Science, University of Utah, UTEC-CSc-74–133, December 1974.

G. Farin, *Curves and surfaces for CAGD, a practical guide*, Academic Press, 1992.

J. D. Foley, et al., *Computer graphics, principles and practice*, Addison Wesley Publishing Company, 1990.

S. Lien, M. Shantz, and V. Pratt, "Adaptive forward differencing for rendering curves and surfaces, Computer Graphics," vol.21, no. 4, July 1987, pp.11–117.

M. Shantz and S. Lien, "Shading bicubic patches," Computer Graphics, vol. 21, no. 4, July 1987, pp. 189–196.

Alan Watt and Mark Watt, *Advanced animation and rendering techniques, theory and practice*, Addison Wesley Publishing Company, 1992.

Figure 2A:
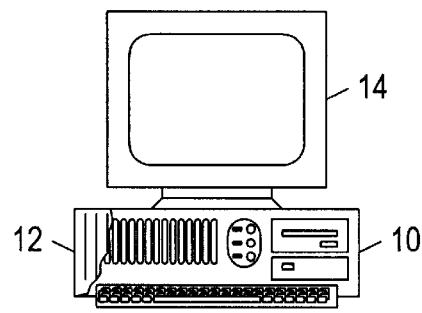
FIG. 2a shows a computer system which graphically renders surface patches.
Figure 2B:
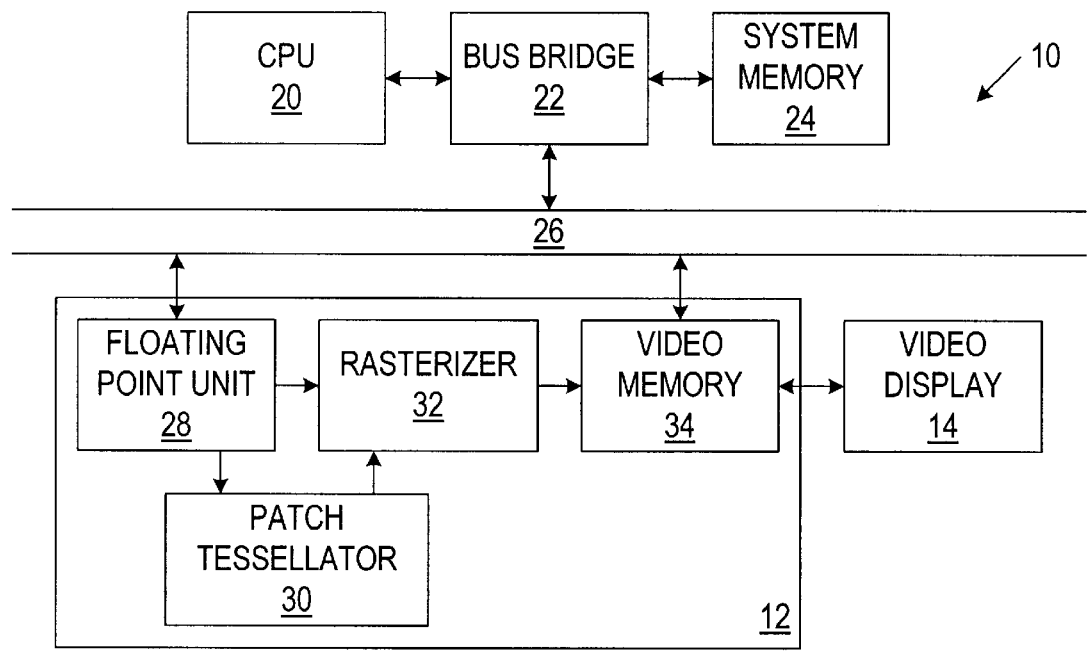
FIG. 2b shows an architecture of a computer system which graphically renders surface patches.

FIG. 2a shows a computer system 10 having a graphics display card 12 which is connected to a graphics display 14. As shown in FIG. 2b, graphics display card 12 includes a floating point unit 28, a patch tessellator 30, and a rasterizer 32. These units are coupled together to implement a graphics rendering pipeline, as will be discussed further below. Computer system 10 also includes a CPU 20, a bus bridge 22, a system memory 24, a bus 26, and video memory 34. During the course of operation, computer system will display objects on display 14 via video memory 34. These objects may be represented in the form of Bezier surface patches. Graphics display card 12 operates to render these Bezier surface patches according to the present invention.

It is noted that computer system 10 is programmable and that in one embodiment, instructions for configuring computer system 10 to operate as described herein may be stored in read-only memory (not shown) or on a storage medium (also not shown). These instructions would then be retrieved and transferred to a processing unit which would then perform the function of patch tessellator 30.

Figure 3:
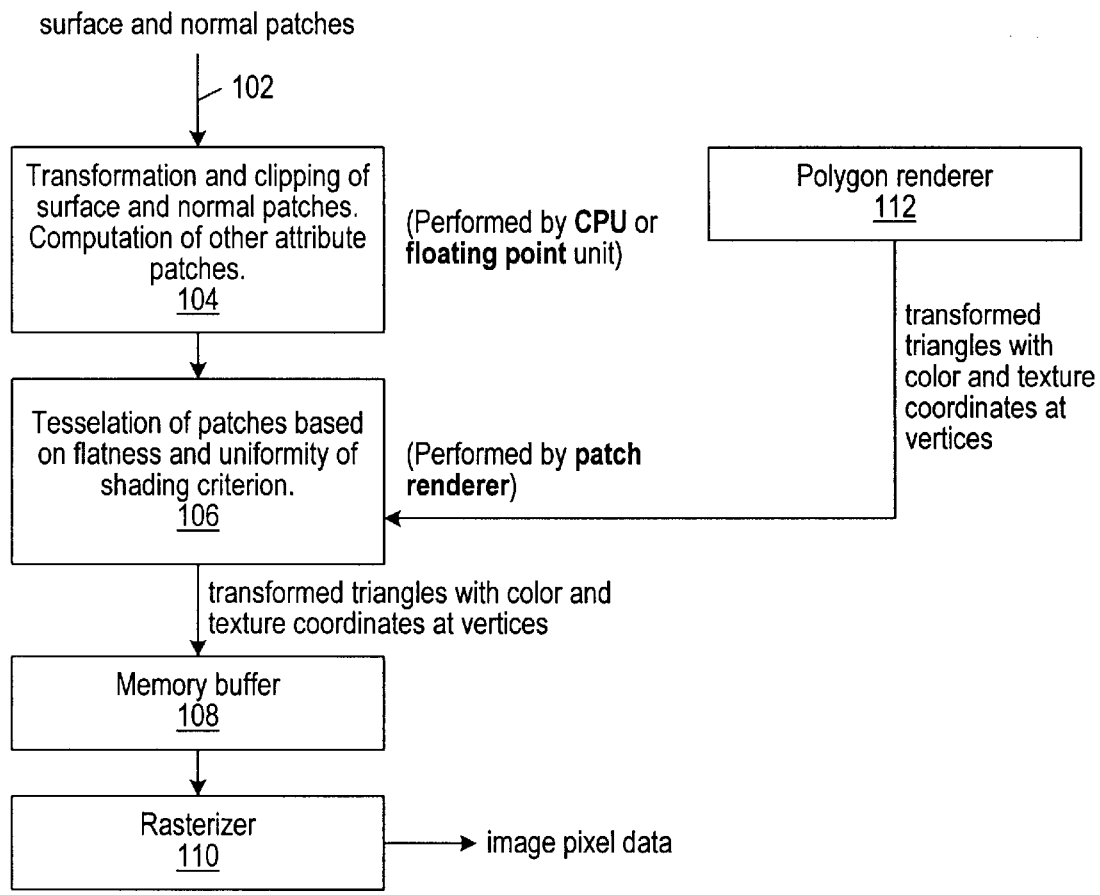
FIG. 3 shows a functional schematic of a graphics rendering pipeline using a method for rendering surface patches.

In FIG. 3, a rendering pipeline 100 for rational Bezier patches is shown. This rendering pipe-line implements a method for converting rational Bezier patches describing the surface of an object, hereafter called surface patches, into a set of triangles. Associated with the surface patches are various attribute patches, e.g., normal patches, RGBA patches, texture patches, half-vector patches, light patches, and reflection vector patches. Normal patches indicate the direction of the normal to the surface patch at each point. RGBA patches indicate the color and opacity of the patch at each point. Texture patches indicate coordinates of an image to be "painted" on a patch Normal, RGBA, and texture patches are invariant, and may be predetermined and provided along with the surface patches as input. Half-vector patches are an average of the viewing vector and the normal vector at each point on the surface patch. Light patches indicate the direction of incident light at each point on the surface patch. Reflection patches indicate the reflection vector at each point on the surface patch. Half-vector, light vector, and reflection vector patches are dependent on the viewing angle, and must be computed after the orientation transformation has been applied to the surface and normal patches. It is noted that for special effects, secondary RGBA and texture patches may also be associated with a surface patch.

Rendering pipeline 100 receives surface, normal, RGBA, and texture patches 102 at functional block 104. The operations of functional block 104 are preferably performed by a CPU or floating point unit, and the operations include: (i) transforming the surface patches to provide a desired perspective, (ii) transforming the normal patches associated with the surface patches, (iii) computing attribute patches for reflection vectors, diffuse color and halfway vector, and (iv) clipping surface patches and corresponding attribute patches such that surface patches fit within 1+e times height and width of viewing screen, where e is a predetermined fraction of the screen dimensions. As mentioned in the background section, the transformations (i) and (ii) may be applied to the patch control points. The computation of the half-vector, light vector, and reflection vector attributes patches may be performed from the surface patch using Coon's patch as will be described further below. The clipping operations (iv), which are performed to facilitate fixed point computations in functional block 106, are preceded by a location test which may use the convex hull property of the Bezier patch control points. As output, functional block 104 provides transformed (and clipped if appropriate) surface and attribute patches. These patches are forwarded to functional block 106.

The operations of functional block 106 include: (i) culling of surface patches and the corresponding attribute patches, (ii) flatness and linearity of shading tests, (iii) tessellations of patches, (iv) computation of coordinates and normal at corners of patches, and (v) specular color computation. In functional block 106 the patches are tessellated into a set of triangles, based on flatness and linearity of shading, as will be described further below. Also in functional block 106, culling and clipping operations are applied to the surface and attributes patches, so that patches which are back-faced or not visible are discarded. The result of the tessellation operations of functional block 106 is a list of triangles with color and texture coordinates at the vertices, and this result is stored in memory buffer 108, and thereafter forwarded to rasterizer 110. Rasterizer 110 also accepts triangles with color and texture coordinates at the vertices from a polygon tessellator 112. Functional block 106 directly forwards the output from polygon tessellator 112 to the rasterizer 110. Rasterizer 110 then provides a sequence of image pixel data suitable for display. The image pixel data may be converted to a video signal by a RAMDAC (random access memory digital to analog converter) video memory.

Referring back to FIG. 2b with continued reference to FIG. 3, floating point unit 28 may be used to implement functional block 104, patch tessellator 30 may be used to implement functional blocks 106 and 108, and rasterizer 32 may be used to implement functional block 110. Floating point unit 28 would then provide transformed patches, transformed triangles, and various commands to the patch tessellator 30. Patch tessellator 30 provides projected triangles or quadrilaterals to rasterizer 32, and rasterizer 32 provides texture, color, and z coordinates to video memory 34.

Figure 4:
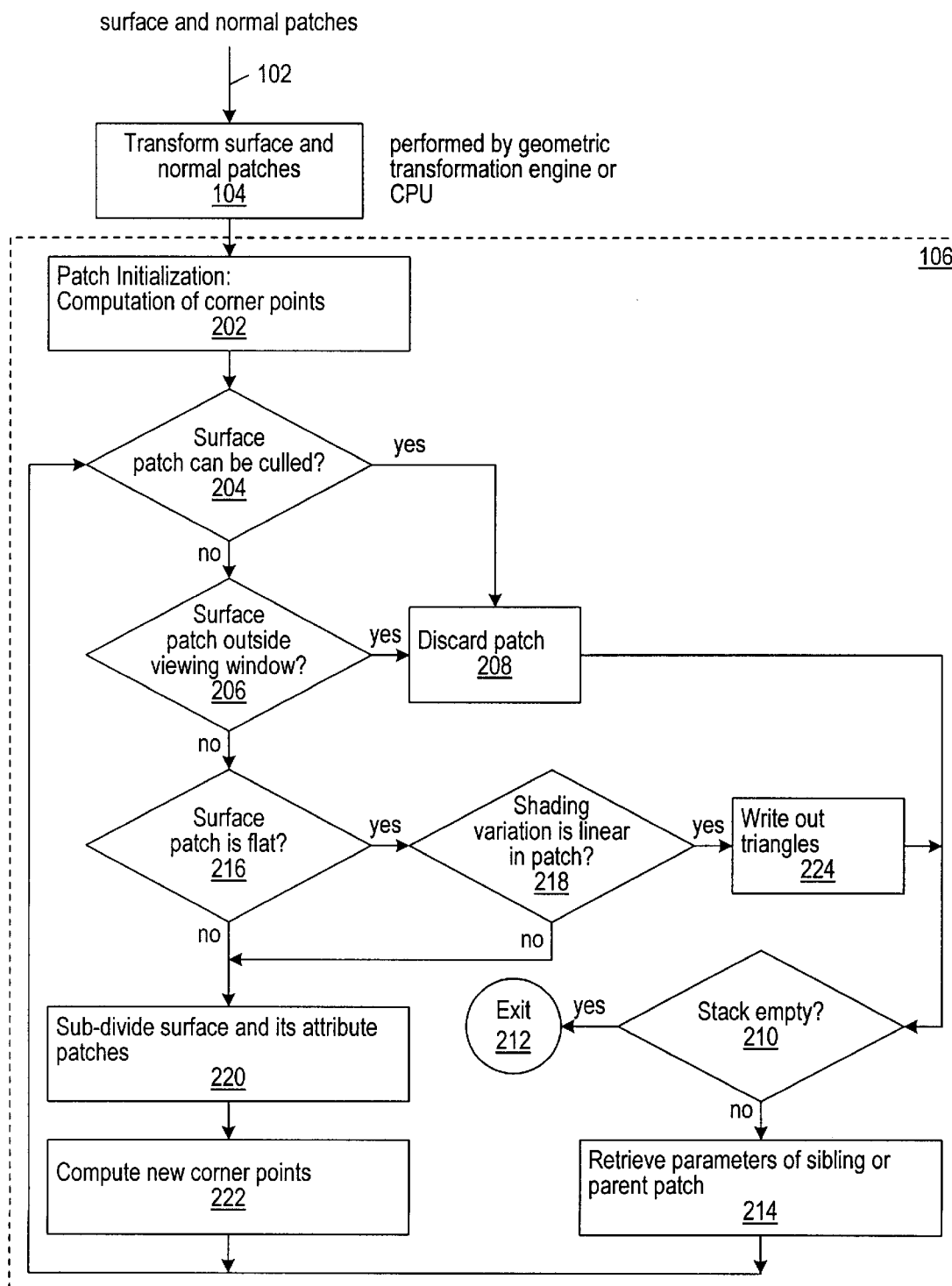
FIG. 4 shows a flowchart of the method for rendering surface patches.

Turning, now to FIG. 4 where a flowchart of the rendering method is shown, the operations of functional block 106 are discussed in greater detail. In functional block 106, the method begins with step 202 where the corner points of the original patch are computed. After this step, the term "patch" is used to refer to both the original patch (the first iteration) and to subpatches of the original patch (in any subsequent iterations). In step 204 a test is made to determine if the patch can be culled, i.e. if the patch is back-faced, and in step 206, a test is made to determine if the patch is outside the viewing window. If the answer to either of these is true, then in step 208 the patch is discarded. After the discard, in step 210, a test is performed to determine if any subpatches are in the stack. If not, the method concludes in step 212 having completely rendered the original patch. If there are subpatches in the stack, then in step 214 the subpatch parameters are retrieved, and the method returns to step 204.

If both the tests in steps 204, 206 are false, then in step 216 a test is made to determine if the patch is flat, and in step 218 a test is made to determine if the shading of the patch has a linear variation. If either test is false, i.e., if the surface patch is not flat and/or the shading variation is not linear in pitch, then in step 220 the patch is subdivided (along with the associated attribute patches). After the patch is subdivided in step 220, in step 222 new corner points for the subpatches are calculated, and one of the subpatches is placed on the stack. The method then returns to step 204 with the remaining subpatch. If both tests in steps 216, 218 are true, i.e., the surface patch is flat and the shading variation is linear in pitch, then in step 224 then patch is divided into triangles and written out. The method then proceeds to step 210 where, as discussed before, a test is made to determine if the stack is empty.

Figure 5:
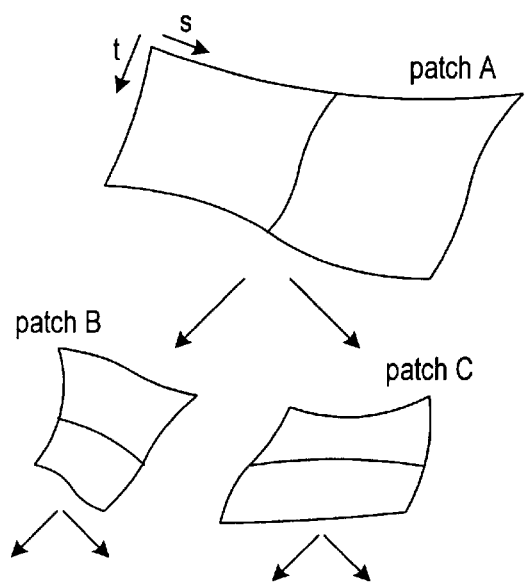
FIG. 5 illustrates a patch subdivision process.

A patch is considered flat if all the curves forming the patch are straight lines within a given user specified tolerance bound. Similarly, a patch is considered linearly shaded if all the curves forming the RGBA patch are straight lines within a given user specified tolerance bound. If the flatness or linear shading condition is not satisfied, the patch is subdivided along the s or t direction. The subdivision process for a patch is shown in FIG. 5. Operations and computations performed in the rendering pipeline are now individually discussed in greater detail.

Patch Subdivision

In FIG. 5, patch A is subdivided along s direction into left patch B and right patch C. Patch B is called a left child of patch A while patch C is called a right sibling of patch B. Patch A is called a parent of patches B or C. Similar operations are performed for patch B and C. When a patch meets flatness and linearity of shading criteria, the patch is divided across any two diagonal corners to form triangles. These triangles are then written out, i.e. the spatial and color coordinates of the triangles are forwarded to the memory buffer and from there to the rasterizer. Once a patch is written out in the form of triangles, its right sibling is generated. For example, once patch B is written out, patch C (right sibling of B) is then generated. Once patch C is also written out in the form of triangles, the triangles representing patches B and C may be combined to form patch A. This completes tessellation of patch A as both subpatches B and C have been written out in the form of triangles. The above described process is repeated recursively for all the patches.

Figure 6:
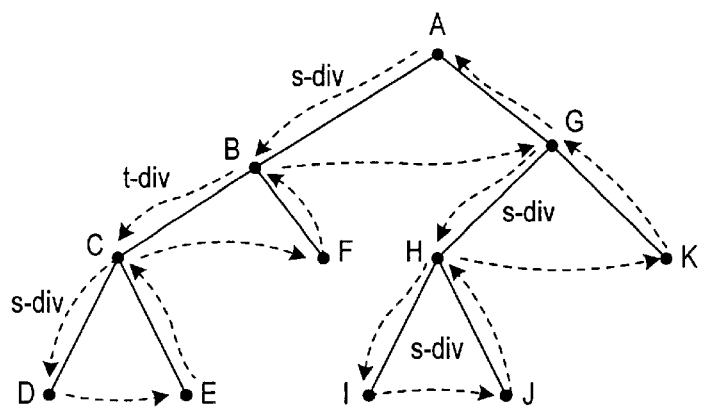
FIG. 6 shows a patch subdivision tree.

A typical subdivision process is shown in the form of subdivision tree in FIG. 6. The order of traversal of the tree is:

$$A \to B \to C \to D \to E \to C \to F \to B \to G \to H \to I \to J \to H \to K \to G \to A$$

Preferably, the subdivision direction alternates, e.g. s, then t, then s. However, once a patch has been determined to be flat in one direction, it is no longer subdivided in that direction, i.e. if a patch is flat in the s direction, it is not thereafter subdivided in the s direction. Rather, all subdivisions will be in the t direction until the t direction has also been determined to be flat. In FIG. 6, patches A, C, G, H are subdivided along s direction and patch B is subdivided along I direction.

Figure 7:
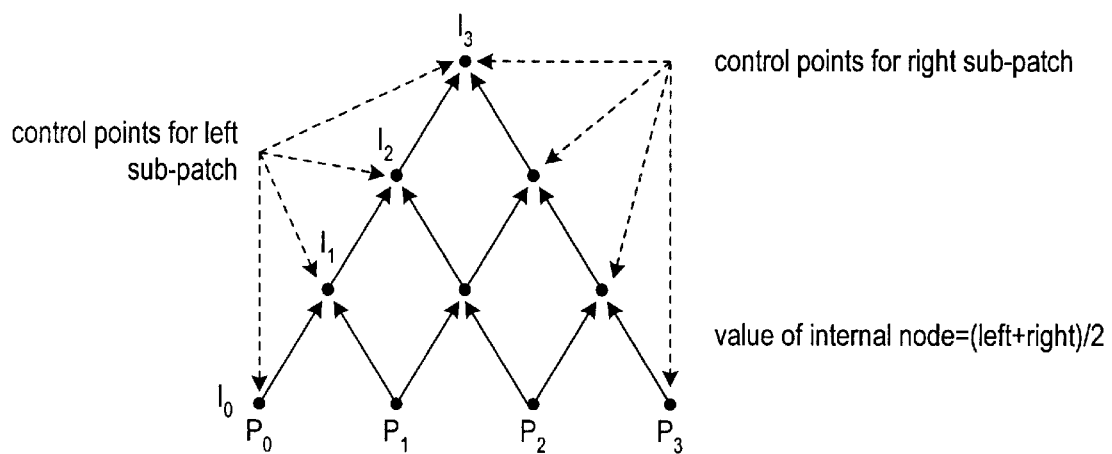
FIG. 7 illustrates a de Casteljau technique for performing a patch subdivision.

A subdivision process for bicubic patches is now described. A bicubic patch is formed by four cubic curves. Subdividing a bicubic patch is equivalent to subdividing each of the four cubic curves. A subdivision process based on the de Casteljau algorithm is described in FIG. 7. This algorithm can be derived from the affine transform properties of Bezier patches. Here, $P_0$, $P_1$, $P_2$ and $p_3$ are the four control points of an original cubic curve and $l_0$, $l_1$, $l_2$ and $l_3$ are the four control points of a subdivided left cubic curve.

A value is determined at each node by taking the average of the two inputs. These operations result in the following control point values for the cubic curves of the left child.

$$l_0 = p_0,$$
$$l_1 = \frac{p_0 + p_1}{2},$$
$$l_2 = \frac{p_0 + 2 \cdot p_1 + p_2}{4},$$
$$l_3 = \frac{p_0 + 3 \cdot (p_1 + p_2) + p_3}{8}$$

It is noted that for fixed point representation of control points, these equations indicate that the 0, 1, 2 and 3 least significant bits of $l_0$, $l_1$, $l_2$, and $l_3$, respectively, can be stored in the stack. These bits can then be retrieved from the stack and attached to the least significant positions of the left child control points before computing the control points of the right sibling as described next.

Figure 8:
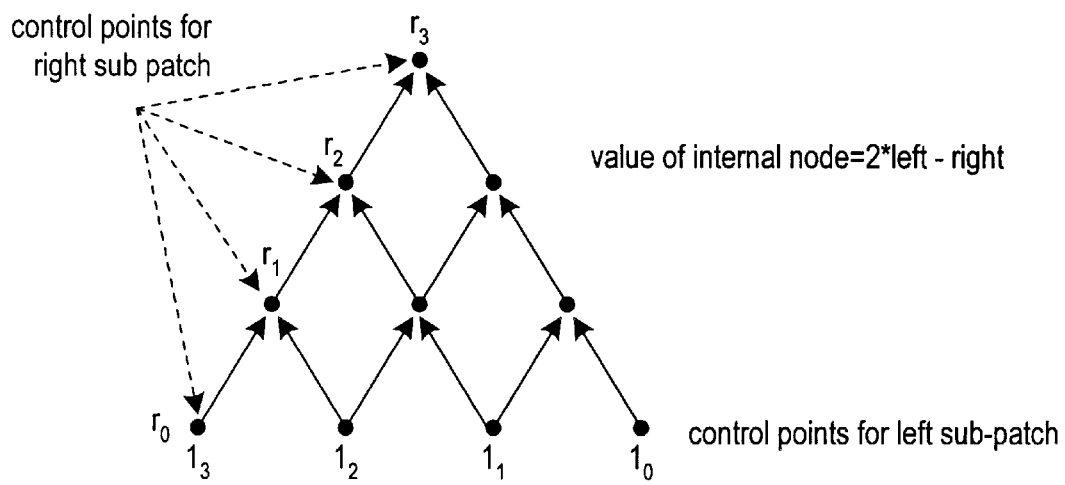
FIG. 8 illustrates a variation of the de Casteljau technique which may be used to determine the control points of a right sibling subpatch.

Turning to FIG. 8, a method is described for determining the right sibling control points $r_0$, $r_1$, $r_2$, and $r_3$, from left child control points $l_0$, $l_1$, $l_2$, $l_3$. A value is determined at each node by doubling the left input and subtracting the right input. These operations result in the following control point values for the cubic curves of the right sibling.

$$r_0 = l_3, \ r_1 = -l_2 + 2 \cdot l_3, \ r_2 = l_1 - 4 \cdot (l_2 - l_3), \ r_3 = -l_0 + 6 \cdot l_1 - 12 \cdot l_2 + 8 \cdot l_3$$

Figure 9:
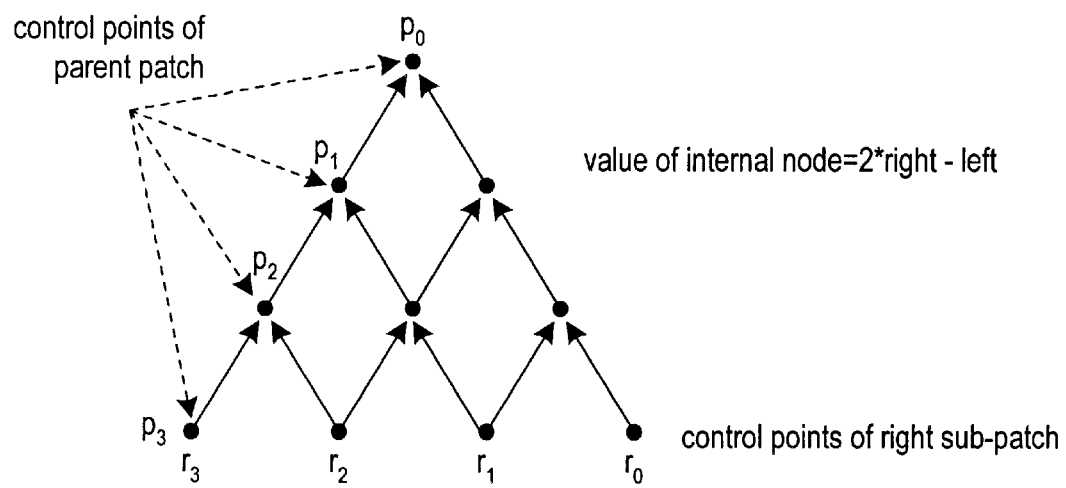
FIG. 9 illustrates a variation of the de Casteljau technique which may be used to determine the control points of a parent surface patch.

The above operations are performed after returning precision bits from the stack to the least significant positions of the left sibling control points. After these operations, the 3, 2, 1, and 0 least significant bits of $r_0$, $r_1$, $r_2$, and $r_3$, respectively, may be stored in the stack to be used later for computing the parent patch if necessary (e.g. to regenerate the control points for the parent patch so that the control points for the as-yet-unrendered right sibling of the parent patch may be obtained). The control points of the parent patch can be obtained from the control points $r_0$, $r_1$, $r_2$, and $r_3$, of the night sibling using computations as described by FIG. 9. A value is determined for each of the nodes by doubling the right input and subtracting the left input. These operations give following values for the control points of the parent patch.

$$p_3 = r_3, p_2 = -r_3 + 2 \cdot r_2, p_1 = r_3 - 4 \cdot (r_2 - r_1), p_0 = -r_3 + 6 \cdot r_2 - 12 r_1 + 8 \cdot r_0$$

In repeated subdivisions, it sometimes occurs that the sign of a re-calculated parent patch control point is lost. To prevent this from occurring, a sign bit is stored on the stack with the precision bits. When the precision bits are retrieved and used to calculate a new patch, the sign bits are used to replace the calculated sign bits.

Figure 10:
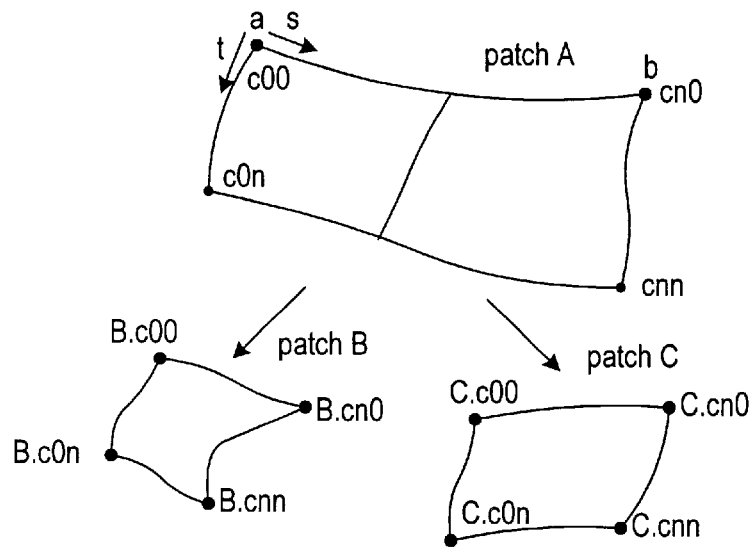
FIG. 10 illustrates the relationships between corner points of a parent surface patch and the right and left subpatches.

The subdivision process requires that, in addition to the control points, the coordinates and normals of the new corner points of the patches be computed. This is done as follows. If the coordinates of the corner points of patch A are $A.C_{00}$, $A.C_{0n}$, $A.C_{n0}$, and $A.C_{nn}$ as shown in FIG. 10, and the normals are $A.N_{00}$, $A.N_{0n}$, $A.N_{n0}$, and $A.N_{nn}$, then after a subdivision along s, the new corner points are now $B.C_{00} = A.C_{00}$, $B.C_{0n} = A.C_{0n}$,
$B.C_{n0} = C.C_{00}$, $B.C_{nn} = C.C_{0n}$,
$C.C_{n0} = A.C_{n0}$, and $C.C_{nn} = A.C_{nn}$.

Similarly, the normals are $B.N_{00} = A.N_{00}$, $B.N_{0n} = A.N_{0n}$,
$B.N_{n0} = C.N_{00}$, $B.N_{nn} = C.N_{0n}$,
$C.N_{n0} = A.N_{n0}$, and $C.N_{nn} = A.N_{nn}$.

Therefore, only two new corner points are computed for each subdivision. Since patch B may be tessellated (i.e. subdivided) further, the corner points of patch C are pushed into stack which are retrieved when the tessellations of patch B have been completed and patch C is ready to be computed for tessellations. If patch A is subdivided along t direction, the corner points are now $B.C_{00}=A.C_{00}$, $B.C_{n0}=A.C_{n0}$,
$B.C_{0n}=C.C_{00}$, $B.C_{nn}=C.C_{n0}$,
$C.C_{0n}=A.C_{0n}$, and $C.C_{nn}=A.C_{nn}$.

Similarly, the normals are $B.N_{00}=A.N_{00}$, $B.N_{n0}=A.N_{n0}$,
$B.N_{0n}=C.N_{00}$, $B.N_{nn}=C.N_{n0}$,
$C.N_{0n}=A.N_{0n}$, and $C.N_{nn}=A.N_{nn}$.

Figure 11:
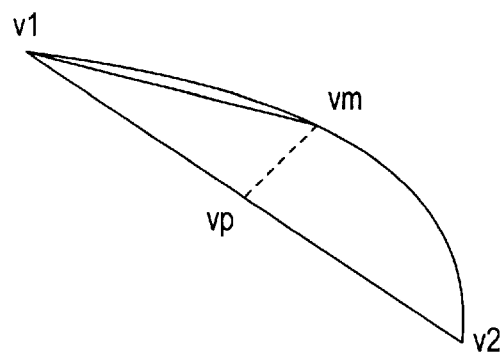
FIG. 11 illustrates a subdivision of a line which has been classified as straight.

If an edge is classified as linear, the new corner points may be computed as shown in FIG. 11. The curve v1,vm,v2 is presumed to be linear. The new corner point vp corresponding to vm is computed as $$vp = \text{frac} \cdot (v2 - v1) + v1$$

wherein $$\text{frac} = ((v2-v1) \cdot (vm-v1))/|v2-v1|$$

Patch Flatness

Figure 12:
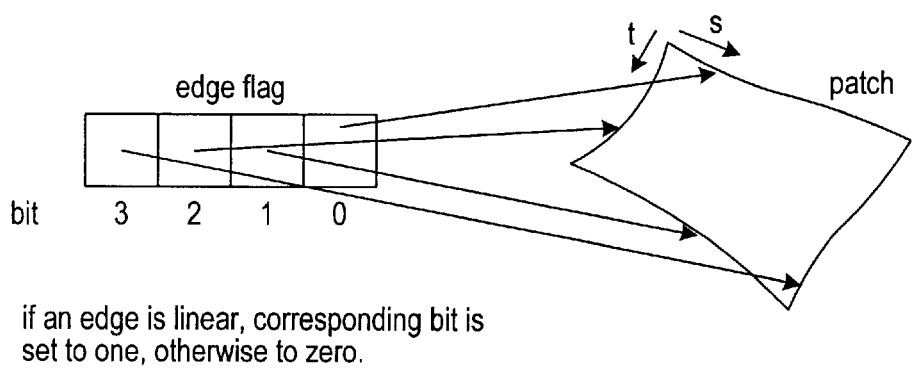
FIG. 12 illustrates a method for storing flags indicative of the straightness of base edges for a surface patch.

A 4-bit flag called an edge flag is used to store linearity classification of edges for a patch. The bits of the edge flag may be associated with specific edges of a patch as shown in FIG. 12. After a subdivision along the s direction, the edge flag for the left child is initialized from the parent edge flag according to edge&0111. Similarly, for the right child, the edge flag is initialized according to edge&1011. For subdivision along the t direction, the edge flag for the left child is initialized to edge&1101, and for the right child edge&1110. Three bits of the edge flag are thereby determined, and the fourth bit which corresponds to the new edge is set according to the results of a straightness test. Since the left child may be tessellated further the edge flag for the right child is pushed into stack.

Figure 13:
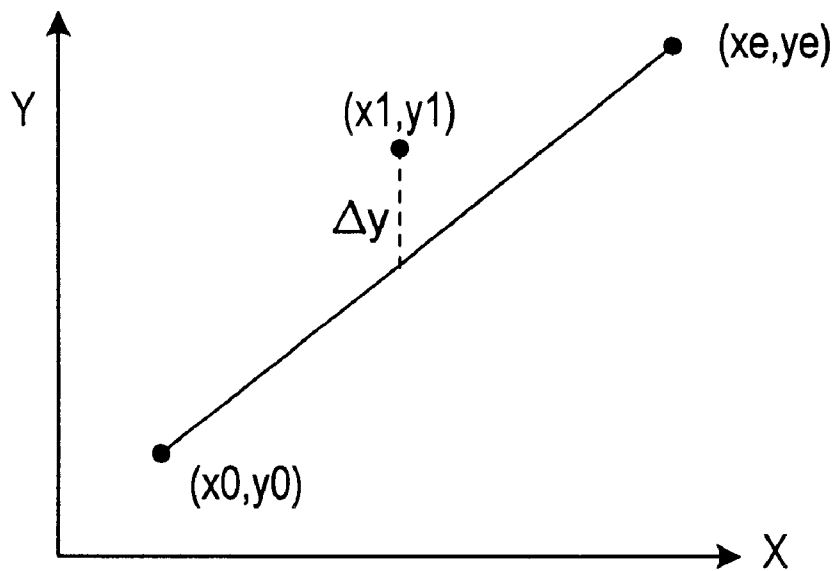
FIG. 13 illustrates a test for straightness of an edge.

If all the curves of a given patch satisfy the straightness criterion, the given patch is classified to be flat. The straightness criterion is now described. FIG. 13 shows a two-dimensional example. The distance Dy of a point $p=(x_1,y_1)$ from line $s_0 s_e$ along y direction is given by following, expression.

$$\Delta y = \frac{(y_1 - y_0) \cdot (x_e - x_0) - (y_e - y_0) \cdot (x_1 - x_0)}{(x_e - x_0)}$$

If the resolution in Y direction is $T_y$, for $(x_1,y_1)$ to be approximately on the line, following condition should be satisfied.

$$|\Delta y| \leq T_y$$

or $$|(y_1-y_0) \cdot (x_e-x_0) - (y_e-y_0) \cdot (x_1-x_0)| \leq T_y \times |(x_e-x_0)|$$

Figure 14:
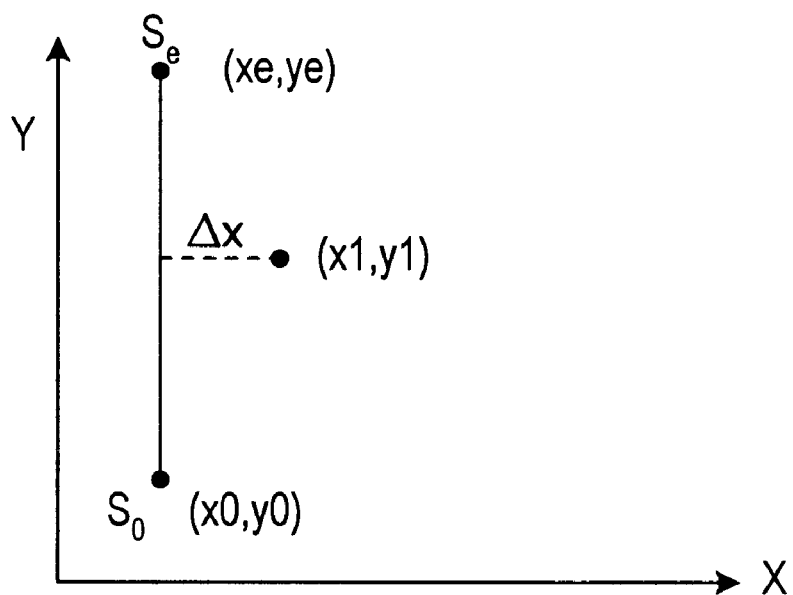
FIG. 14 illustrates an alternate test for straightness of an edge.

When line $s_0 s_1$ is parallel to Y-axis as shown in FIG. 14, both sides of the above expression become zero. In this case, the distance Dx, is calculated according to the following expression.

$$\Delta x = \frac{(x_1 - x_0) \cdot (y_e - y_0) - (x_e - x_0) \cdot (y_1 - y_0)}{(y_e - y_0)}$$

If the resolution in X direction is $T_x$, then for $(x_1,y_1)$ to be approximately on the line, the following condition should be satisfied.

$$|\Delta x| \leq T_x$$

or $$|(y_1-y_0) \cdot (x_e-x_0) - (y_e-y_0) \cdot (x_1-x_0)| \leq T_x \times |(y_e-y_0)|$$

A Bezier curve is completely contained within the convex hull of its control points. Hence if all the control points are less than a given distance away from a line connecting the end points, then every point on the curve is less than this distance away from the line. Applying the above comparisons using the intermediate control points (i.e. the control points which are not also end points) consequently yields a useful straightness test.

In general, the above conditions for straightness test of a curve may be written as follows.

if $$|x_e-x_0| > |y_e-y_0|$$

then $$|(y_1-y_0) \cdot (x_e-x_0) - (y_e-y_0) \cdot (x_1-x_0)| \leq T_y \times |(x_e-x_0)|$$

else $$|(y_1-y_0) \cdot (x_e-x_0) - (y_e-y_0) \cdot (x_1-x_0)| \leq T_x \times |(y_e-y_0)|$$

For the 3D case, for a point $(x_1,y_1,z_1)$ to be approximately on the line joining points $(x_0,y_0,z_0)$ and $(x_e,y_e,z_e)$, the following conditions are satisfied.

if $$|x_e-x_0| > |y_e-y_0|$$

then $$|(y_1-y_0) \cdot (x_e-x_0) - (y_e-y_0) \cdot (x_1-x_0)| \leq T_y \times |(x_e-y_0)|$$

$$|(z_1-z_0) \cdot (x_e-x_0) - (z_e-z_0) \cdot (x_1-x_0)| \leq T_z \times |(x_e-x_0)|$$

else $$|(y_1-y_0) \cdot (x_e-x_0) - (y_e-y_0) \cdot (x_1-x_0)| \leq T_x \times |(y_e-y_0)|$$

$$|(z_1-z_0) \cdot (y_e-y_0) - (z_e-z_0) \cdot (y_1-y_0)| \leq T_z \times |(y_e-y_0)|$$

For a given patch, this process is performed for non-straight edges (edges with zero bit in the edge flag) of patch. If at least one edge of patch along the s direction and at least one edge along t direction are not straight, the patch is subdivided along the s direction if previous subdivision was along t direction, otherwise subdivision is performed along the t direction. Otherwise, if edges are non-straight along only one of the s or t directions, the patch is subdivided along the non-straight direction. If edges along both the s and t directions are straight, then all the non-edge curves of a patch are tested for straightness. If all the curves of a patch along one direction are straight, patch is called flat along this direction. If a patch is flat along both s and t directions, the patch is classified as flat, otherwise it is subdivided along non-flat direction.

Linearity of Shading

This criterion is based on the linearity of change in the diffuse component of color across a patch classified as flat based on flatness criterion. The control points $D_{ij}, 0 \leq i,j \leq 3$, of the RGBA color patch are used for linearly interpolating diffuse color across a patch (the computation of these control points is discussed further below). This criterion is tested after a patch is classified to be flat. This criterion is tested using expressions which are extensions of the previous expressions for the flatness criterion. Let the color value at $s_0$, $s_e$, and $(x_1,y_1,z_1)$ be $d_0$, $d_e$, and $d_1$, respectively. The condition for testing linearity in shading is given by
if $$|x_e - x_0| > |y_e - y_0|$$

then $$|(d_1-d_0)\cdot(x_e-x_0)-(d_e-d_0)\cdot(x_1-x_0)| \leq T_d \times |(x_e-x_0)|$$

else $$|(d_1-d_0)\cdot(y_e-y_0)-(d_e-d_0)\cdot((y_1-y_0)| \leq T_d \times |(y_e-y_0)|$$

where $T_d$ is tolerance for color.

Culling

A patch is completely culled if $$(g_{i+1,j}\cdot x - g_{i,j+1}\cdot x, g_{i+1,j}\cdot y - g_{i,j+1}\cdot y) \times (g_{i+1,j+1}\cdot x - g_{i,j}\cdot x, g_{i+1,j+1}\cdot y - g_{i,j}\cdot y) < 0$$

for all the control points, where $0 \leq i < s\_degree$ and $0 \leq j < t\_degree$. If this test holds true, the patch is backfaced and cannot be seen. If the above product is greater than zero for all the control points, it implies that the patch is completely visible. In such cases, a cull flag for the patch is set to zero so that no culling test need be done for any of its subpatches.

Clipping

A patch is completely clipped if none of its control points lies inside the viewing window, i.e.

$$-(1+e) < g_{i+1,j}\cdot x < (1+e),\ -(1+e) < g_{i+1,j}\cdot y < (1+e)$$

and $$-1 < g_{i+1,j}\cdot z < 0,$$

for $0 \leq i \leq s\_degree$ and $0 \leq j \leq t\_degree$. On the other hand, if all the control points of a patch lie inside the viewing window, a clip flag for the patch is set to zero, implying no clipping test need be performed for any of its subpatches. Here, e is a small fraction of image size. For example, for 512×512 image, e can be set to ¹⁄₆₄, allowing 520×520 viewing space for patch clipping.

Normal Computation

The normal to a surface at a point may be defined as $$N(s,t) = \frac{\partial Q(s,t)}{\partial s} \times \frac{\partial Q(s,t)}{\partial t}$$

Using this definition as a method for computation is undesirable since it is computationally expensive. One division, one square root and number of additions and multiplications would be required in order to compute the normal at each point. To avoid this expensive operation, the normal computation for a patch is instead approximated using, Coon's patch. Coon's patch is a bicubic Bezier patch which may be used to approximate a two-dimensional function from samples of the function and its derivatives at the corner points.

The determination of the normal proceeds in the following manner. The components of the above cross product appear as follows:

$$n_x = \frac{\partial}{\partial s}\left(\frac{S \cdot M \cdot G_y \cdot M \cdot T^T}{S \cdot M \cdot G_w \cdot M \cdot T^T}\right) \cdot \frac{\partial}{\partial t}\left(\frac{S \cdot M \cdot G_z \cdot M \cdot T^T}{S \cdot M \cdot G_w \cdot M \cdot T^T}\right) - $$
$$\frac{\partial}{\partial t}\left(\frac{S \cdot M \cdot G_y \cdot M \cdot T^T}{S \cdot M \cdot G_w \cdot M \cdot T^T}\right) \cdot \frac{\partial}{\partial s}\left(\frac{S \cdot M \cdot G_z \cdot M \cdot T^T}{S \cdot M \cdot G_w \cdot M \cdot T^T}\right)$$

$$n_y = \frac{\partial}{\partial s}\left(\frac{S \cdot M \cdot G_z \cdot M \cdot T^T}{S \cdot M \cdot G_w \cdot M \cdot T^T}\right) \cdot \frac{\partial}{\partial t}\left(\frac{S \cdot M \cdot G_x \cdot M \cdot T^T}{S \cdot M \cdot G_w \cdot M \cdot T^T}\right) - $$
$$\frac{\partial}{\partial t}\left(\frac{S \cdot M \cdot G_z \cdot M \cdot T^T}{S \cdot M \cdot G_w \cdot M \cdot T^T}\right) \cdot \frac{\partial}{\partial s}\left(\frac{S \cdot M \cdot G_x \cdot M \cdot T^T}{S \cdot M \cdot G_w \cdot M \cdot T^T}\right)$$

$$n_z = \frac{\partial}{\partial s}\left(\frac{S \cdot M \cdot G_x \cdot M \cdot T^T}{S \cdot M \cdot G_w \cdot M \cdot T^T}\right) \cdot \frac{\partial}{\partial t}\left(\frac{S \cdot M \cdot G_y \cdot M \cdot T^T}{S \cdot M \cdot G_w \cdot M \cdot T^T}\right) - $$
$$\frac{\partial}{\partial t}\left(\frac{S \cdot M \cdot G_x \cdot M \cdot T^T}{S \cdot M \cdot G_w \cdot M \cdot T^T}\right) \cdot \frac{\partial}{\partial s}\left(\frac{S \cdot M \cdot G_y \cdot M \cdot T^T}{S \cdot M \cdot G_w \cdot M \cdot T^T}\right)$$

The derivatives $$\frac{\partial}{\partial s},\ \frac{\partial}{\partial t},\ \frac{\partial^2}{\partial s \partial t}$$

of $n_x$, $n_y$, and $n_z$ may then be computed by evaluating derivatives of above equations. Since it is the unit normal vector which is of primary interest, its components are computed as follows:

$$\hat{n}_x(s,t) = \frac{n_x}{\sqrt{n_x^2 + n_y^2 + n_z^2}}$$

For clarity, let $$W(s,t) = \frac{1}{\sqrt{n_x^2 + n_y^2 + n_z^2}}$$

then the derivatives of the unit normal components are:

$$\frac{\partial \hat{n}_x}{\partial s} = \frac{\partial n_x}{\partial s} \cdot W + \frac{\partial W}{\partial s} \cdot n_x$$

$$\frac{\partial \hat{n}_x}{\partial t} = \frac{\partial n_x}{\partial t} \cdot W + \frac{\partial W}{\partial t} \cdot n_x$$

$$\frac{\partial^2 \hat{n}_x}{\partial s \partial t} = \frac{\partial^2 n_x}{\partial s \partial t} \cdot W + \frac{\partial^2 W}{\partial s \partial t} \cdot n_x + \frac{\partial n_x}{\partial s} \cdot \frac{\partial W}{\partial t} + \frac{\partial W}{\partial s} \cdot \frac{\partial n_x}{\partial t}$$

with the derivatives of $W(s,t)$ given by:

$$\frac{\partial W}{\partial s} = -W^3 \cdot \left(n_x \cdot \frac{\partial n_x}{\partial s} + n_y \cdot \frac{\partial n_y}{\partial s} + n_z \cdot \frac{\partial n_z}{\partial s}\right)$$

$$\frac{\partial W}{\partial t} = -W^3 \cdot \left(n_x \cdot \frac{\partial n_x}{\partial t} + n_y \cdot \frac{\partial n_y}{\partial t} + n_z \cdot \frac{\partial n_z}{\partial t}\right)$$

$$\frac{\partial^2 W}{\partial s \partial t} = \frac{3}{X} \cdot \frac{\partial W}{\partial s} \cdot \frac{\partial W}{\partial t} - W^3 \cdot \left(\frac{\partial n_x}{\partial s} \cdot \frac{\partial n_x}{\partial t} + \frac{\partial n_y}{\partial s} \cdot \frac{\partial n_y}{\partial t} + \frac{\partial n_z}{\partial s} \cdot \frac{\partial n_z}{\partial t}\right) -$$
$$W^3 \cdot \left(n_x \cdot \frac{\partial^2 n_x}{\partial s \partial t} + n_y \cdot \frac{\partial^2 n_y}{\partial s \partial t} + n_z \cdot \frac{\partial^2 n_z}{\partial s \partial t}\right)$$

With the above equations, the unit normal components and their derivatives can be quickly evaluated at the corner points of the patch. A matrix is formed of the results (only the x component is shown, the other components are similarly obtained):

$$R_x = \begin{bmatrix} \hat{n}_x(0,0) & \hat{n}_x(0,1) & \frac{\partial \hat{n}_x}{\partial t}(0,0) & \frac{\partial \hat{n}_x}{\partial t}(0,1) \\ \hat{n}_x(1,0) & \hat{n}_x(1,1) & \frac{\partial \hat{n}_x}{\partial t}(1,0) & \frac{\partial \hat{n}_x}{\partial t}(1,1) \\ \frac{\partial \hat{n}_x}{\partial s}(0,0) & \frac{\partial \hat{n}_x}{\partial s}(0,1) & \frac{\partial^2 \hat{n}_x}{\partial s \partial t}(0,0) & \frac{\partial^2 \hat{n}_x}{\partial s \partial t}(0,1) \\ \frac{\partial \hat{n}_x}{\partial s}(1,0) & \frac{\partial \hat{n}_x}{\partial s}(1,1) & \frac{\partial^2 \hat{n}_x}{\partial s \partial t}(1,0) & \frac{\partial^2 \hat{n}_x}{\partial s \partial t}(1,1) \end{bmatrix}$$

From this, the Coon's patch approximation is obtained by the following equation:

$$N_x(s,t) = S \cdot C \cdot R_x \cdot C^T \cdot T^T$$

where $$C = \begin{bmatrix} 2 & -2 & 1 & 1 \\ -3 & 3 & -2 & -1 \\ 0 & 0 & 1 & 0 \\ 1 & 0 & 0 & 0 \end{bmatrix}$$

Diffuse Color Computation

Let the light source be at $(l_x, l_y, l_z)$, then the diffuse color at $(x(s,t), y(s,t), z(s,t))$ is given by $$d(s,t) = \frac{\hat{n}_x(s,t) \cdot L_x(s,t) + \hat{n}_y(s,t) \cdot L_y(s,t) + \hat{n}_z(s,t) \cdot L_z(s,t)}{\sqrt{L_x^2(s,t) + L_y^2(s,t) + L_z^2(s,t)}}$$

where $(L_x(s,t), L_y(s,t), L_z(s,t)) = (l_x - x(s,t), l_y - y(s,t), l_z - z(s,t))$. In a manner similar to the normal vector computation, the above function may be approximated with the Coon's patch technique to avoid computing the diffuse color at each point with the above equation. The following matrix is formed:

$$Diff = \begin{bmatrix} d(0,0) & d(0,1) & \frac{\partial d}{\partial t}(0,0) & \frac{\partial d}{\partial t}(0,1) \\ d(1,0) & d(1,1) & \frac{\partial d}{\partial t}(1,0) & \frac{\partial d}{\partial t}(1,1) \\ \frac{\partial d}{\partial s}(0,0) & \frac{\partial d}{\partial s}(0,1) & \frac{\partial^2 d}{\partial s \partial t}(0,0) & \frac{\partial^2 d}{\partial s \partial t}(0,1) \\ \frac{\partial d}{\partial s}(1,0) & \frac{\partial d}{\partial s}(1,1) & \frac{\partial^2 d}{\partial s \partial t}(1,0) & \frac{\partial^2 d}{\partial s \partial t}(1,1) \end{bmatrix}$$

and the Coon's patch approximation made:

$$D(s,t) = S \cdot C \cdot Diff \cdot C^T \cdot T^T$$

where once again $$C = \begin{bmatrix} 2 & -2 & 1 & 1 \\ -3 & 3 & -2 & -1 \\ 0 & 0 & 1 & 0 \\ 1 & 0 & 0 & 0 \end{bmatrix}$$

Half Way Vector Computation

Let the light source be at $(l_x, l_y, l_z)$, and viewing location be at $(v_x, v_y, v_z)$. Next, let $L(s,t) = (L_x(s,t), L_y(s,t), L_z(s,t)) = (l_x - x(s,t), l_y - y(s,t), l_z - z(s,t))$ and $V(s,t) = (V_x(s,t), V_y(s,t), V_z(s,t)) = (v_x - x(s,t), v_y - y(s,t), v_z - z(s,t))$, and define the unit vectors $$\hat{L}(s,t) = \frac{L(s,t)}{|L(s,t)|}, \text{ and } \hat{V}(s,t) = \frac{V(s,t)}{|V(s,t)|}.$$

Then the half-way vector at $(x(s,t), y(s,t), z(s,t))$ is given by $$h(s,t) = \frac{\hat{L}(s,t) + \hat{V}(s,t)}{2}$$

Once again, the Coon's patch technique may be employed:

$$Hvector_x = \begin{bmatrix} h_x(0,0) & h_x(0,1) & \frac{\partial h_x}{\partial t}(0,0) & \frac{\partial h_x}{\partial t}(0,1) \\ h_x(1,0) & h_x(1,1) & \frac{\partial h_x}{\partial t}(1,0) & \frac{\partial h_x}{\partial t}(1,1) \\ \frac{\partial h_x}{\partial s}(0,0) & \frac{\partial h_x}{\partial s}(0,1) & \frac{\partial^2 h_x}{\partial s \partial t}(0,0) & \frac{\partial^2 h_x}{\partial s \partial t}(0,1) \\ \frac{\partial h_x}{\partial s}(1,0) & \frac{\partial h_x}{\partial s}(1,1) & \frac{\partial^2 h_x}{\partial s \partial t}(1,0) & \frac{\partial^2 h_x}{\partial s \partial t}(1,1) \end{bmatrix}$$

$$H_x(s,t) = S \cdot C \cdot Hvector_x \cdot C^T \cdot T^T$$

where C s as previously defined.

Reflection Vector Computation

The reflection vector at a point $(x(s,t), y(s,t), z(s,t))$ is given by $$(r_x(s,t), r_y(s,t), r_z(s,t)) = 2(N(s,t) \cdot V(s,t)) \cdot N(s,t) - L(s,t)$$

and may also be approximated with the Coon's patch technique, so that $$Ref_x(s,t) = S \cdot C \cdot reflection_x \cdot C^T \cdot T^T$$

As before, the y and z components are computed in a similar fashion.

$$reflection_x = \begin{bmatrix} r_x(0,0) & r_x(0,1) & \frac{\partial r_x}{\partial t}(0,0) & \frac{\partial r_x}{\partial t}(0,1) \\ r_x(1,0) & r_x(1,1) & \frac{\partial r_x}{\partial t}(1,0) & \frac{\partial r_x}{\partial t}(1,1) \\ \frac{\partial r_x}{\partial s}(0,0) & \frac{\partial r_x}{\partial s}(0,1) & \frac{\partial^2 r_x}{\partial s \partial t}(0,0) & \frac{\partial^2 r_x}{\partial s \partial t}(0,1) \\ \frac{\partial r_x}{\partial s}(1,0) & \frac{\partial r_x}{\partial s}(1,1) & \frac{\partial^2 r_x}{\partial s \partial t}(1,0) & \frac{\partial^2 r_x}{\partial s \partial t}(1,1) \end{bmatrix}$$

Now that the operations of the rendering pipeline shown in FIG. 4 have been discussed in detail, portions of the system of FIG. 2b for implementing the rendering pipeline are now discussed at greater length.

Figure 15:
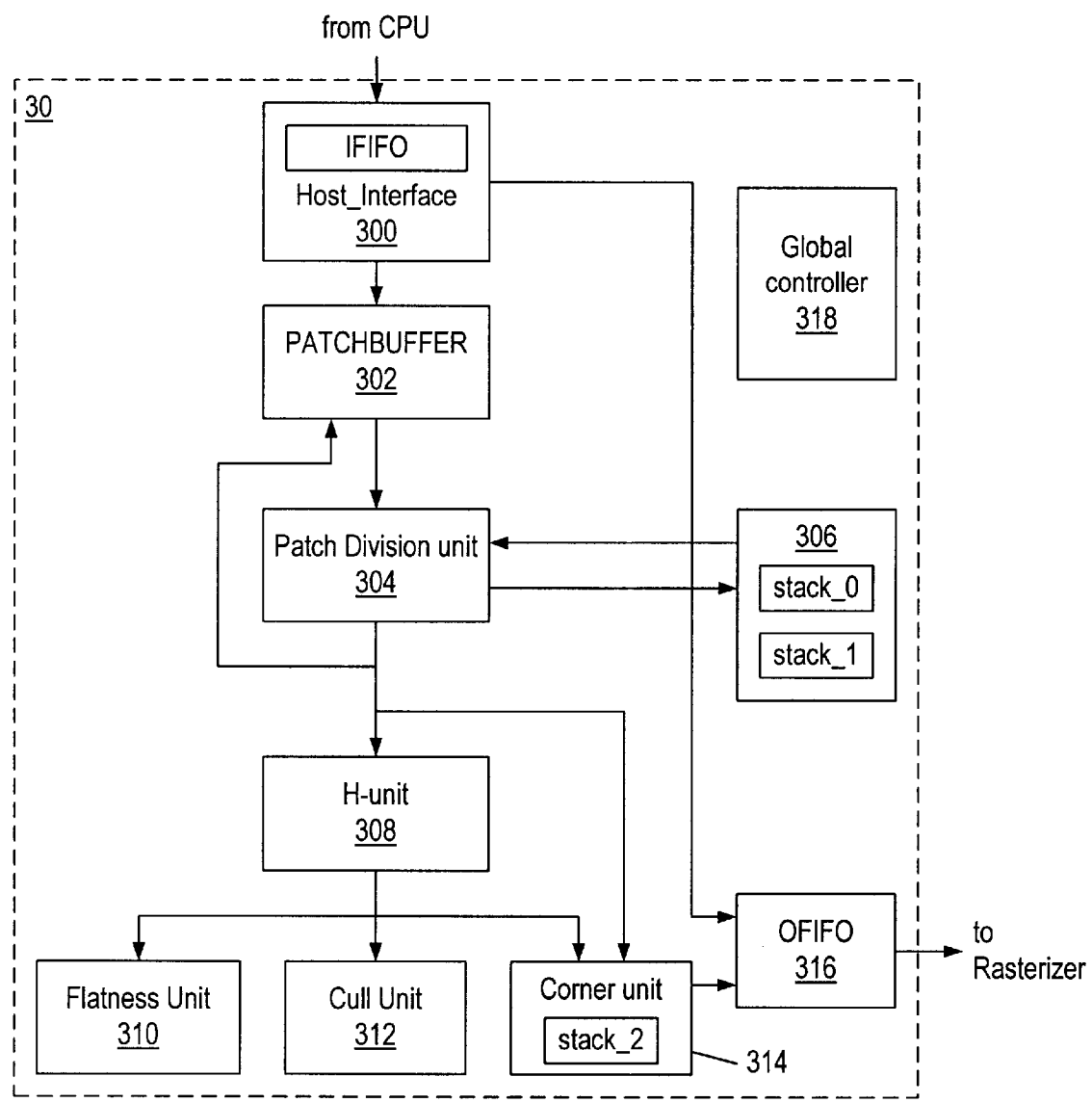
FIG. 15 is a block diagram of a patch tessellator.

Turning to FIG. 15, a block diagram of patch tessellator 30 is shown. The patch tessellator 30 generates (adaptively or to a fixed depth) a set of projected triangles from rational bezier patches of third degree or less. It can also compute specular colors and/or discard back-face portion of a patch. After getting a transformed surface patch and its attribute patches, the patch tessellator 30 tests the surface patches for back-face culling and flatness. A patch is considered flat if all its eight curves (in the case of a bicubic patch) are straight within a given user specified tolerance bound. If the flatness criterion is not satisfied, the patch is sub-divided. If the patch is flat for a given tolerance criterion, it can be tested for shading uniformity. Once a patch meets the uniformity of shading criterion, it is sent to rasterizer a pair of triangles for rendering. In the case of fixed-depth tessellation, the patch is not tested for flatness. A patch is tessellated in the s and t directions alternately until the specified level of subdivision is reached.

When a pair of triangles specifying a patch is sent to the rasterizer 32, the pair of triangles can be specified using only four vertices in a predetermined order. The first three vertices specify a triangle, and the last two of these vertices in combination with a fourth vertex will specify the second triangle. Triangle pairs specified in this form are herein referred to as quadrilaterals.

The inputs to the patch tessellator 30 are control points of a perspectively transformed surface and the corresponding attributes such as color and texture. The output of the patch tessellator 30 is a set of triangles projected on the screen, with colors and texture coordinates at their vertices. This set of triangles is then fed to rasterizer 32 for conversion to pixel data. The patch tessellator 30 can also accept a set of projected triangles to be directly sent to rasterizer 32.

Patch tessellator 30 comprises a host interface 300, a patch buffer 302, a patch division unit 304, a stack memory 306, a homogenizing unit (H-unit) 308, a flatness unit 310, a cull unit 312, a corner unit 314, an output first-in-first-out (OFIFO) buffer 316, and a controller 318. The host interface 300 includes an input first-in-first-out (IFIFO) buffer, the stack memory 306 includes a stack 0 and a stack 1, and the corner unit 314 includes a stack 2.

The host interface 300 is responsible for transferring data to the patch buffer 302 and the OFIFO buffer 316. The incoming data is stored in the IFIFO, which holds one 41-bit word. The 41 bits consists of 32 bits of data and a 9 bit address designating the destination of the data. The first 128 words of the address space are reserved for the rasterizer 32, so any addresses having 00 for the most significant two bits are routed automatically to the OFIFO buffer 316, which stores 50 39-bit words. Typical data for these address space destinations includes rasterizer commands and parameters, and triangle data such as vertex coordinates, colors, and textures. The next 186 words of address space are used by the patch buffer 302, and addresses in this range are routed to the patch buffer.

Data is stored in the IFIFO buffer when both (i) the host interface receives a write request, and (ii) the IFIFO buffer is not full. Data is retrieved from the IFIFO buffer when either (i) the destination is in the patch buffer address space and the patch buffer is not busy, or (ii) the destination is in the rasterizer address space and the patch tessellator 30 is not rendering a patch and the OFIFO buffer is not full. Otherwise, data is stalled in the IFIFO buffer.

The patch buffer 302 stores patch data such as the X,Y,Z and W coordinate values of the patch control points, the primary and secondary color and texture values, specular and shading color values, and perspective correction values. Additional registers are available in the patch buffer for scale factors and translation factors of the patch, a foreground specular color, flatness tolerance values, and the degree of the patch. Finally, a command register is included, and writing a trigger value to this resister causes the patch division unit 304 to begin operating on the data stored by the patch buffer t 302.

The patch division unit 304 processes the data in patch buffer 302 to compute new subpatches. Given the data for the patch stored in the patch buffer 302, the patch division unit computes a left child, a right child, or a parent patch. During these computations, precision bits are stored into or retrieved from stack 306 to maintain accuracy. The output of the patch division unit 304 is stored back into patch buffer 302 and sent to the H-unit 308 at the same time.

The coordinates of each of the control points are computed by the H-unit 308, which then sends the coordinates to the flatness unit 310, the cull unit 312, and the corner unit 314 for testing. The values x/w,y/w,z/w and 1/w are calculated for each control point, and the color and texture values are simply for-warded. The control points for color and textures are sent only to the corner unit 314.

The flatness unit 310 tests if the current patch meets the flatness and/or linearity of shading criterion. If the adaptive tessellation level is enabled, the next patch computation of the patch division unit 304 is determined by the results of these tests.

While the flatness unit 310 tests for flatness, the cull unit 312 tests if the current patch is completely back-faced. If culling, is enabled, then a back-faced patch is discarded. If a patch is not back-faced, and it passes the flatness and linearity of shading criterion, then the corner unit 314 tessellates the flat patch into two triangles across two diagonal corners.

The corner unit 314 computes the color and texture values for the corners of the current patch and stores them in a stack (stacks_2) with the corner coordinates of the current patch. The corner coordinates of the current patch are provided from the H-unit 308, although the corner unit 314 may recompute them using a straight-line algorithm if the patch division unit 304 is subdividing a patch along a curve which has been classified as flat. When a patch qualifies for tessellation, the corner unit 314 computes the screen coordinates of the vertices of triangles and pushes these vertices along with their attributes into the OFIFO buffer 316.

The controller 318 manages flow control signals and detects test results from flatness unit 310 and cull unit 312 to determine the next operation of the patch division unit 304. Controller 318 stores the patch EDGE, CULL, SPLIT_DIR, FLAT_S, and FLAT_T flags in a stack (stack_0). These flags are stored together within a word, and the stack has 10 words. The EDGE flag has a bit for each of the patch edges to indicate if the edges have tested as straight, the CULL flag indicates if culling is enabled for this patch, the SPLIT_DIR patch indicates whether the patch was split in the s or t direction, the FLAT_S flag indicates if the patch has tested flat in the s direction, and the FLAT_T flag indicates if the patch has tested flat in the t direction.

Figure 16:
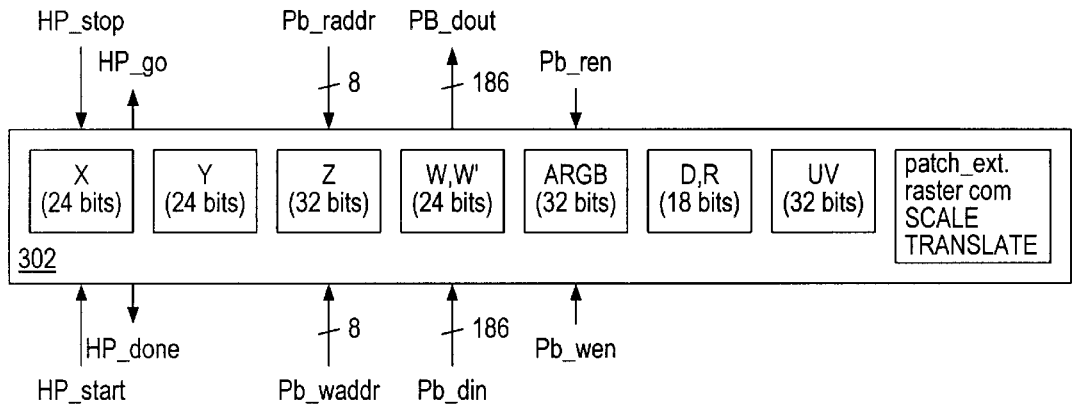
FIG. 16 illustrates the configuration of a patch buffer unit.

Referring now to FIG. 16, a block diagram of the patch buffer 302 is shown. Patch buffer 302 comprises 186 registers configured into eight blocks. The eight blocks are the X, Y, Z, W, color (RGBA), shading (DR), texture (UV), and extension blocks. The 186 registers are read from and written to individually by the host 28, but read/written in blocks by the patch division unit 304 (as will be discussed further below). For a host write command, the PB_WEN signal is set to zero, while for a patch division unit write command, the PB_WEN signal is set to one. Similarly, for a host read command, the PB_REN signal is set to zero, while for a patch division unit read command, the PB_REN signal is set to one. The read and write addresses are specified by PB_RADDR and PBWADDR respectively. Writing to the patch buffer by the host is allowed when the HP_GO signal is asserted, and such a write operation is terminated when the HP_STOP signal is asserted. When a trigger signal is written to the command register, the patch buffer asserts the HP_START signal to initiate processing of the current patch, and the HP_DONE signal is asserted when the processing is completed.

The data in (PB_DIN) and data out (PB_DOUT) signal busses are 186 bits wide. When the patch division unit accesses the patch buffer, it reads from or writes to the X, Y, Z, W, RGBA, DR, and UV blocks all at once. The first sixteen address locations each provide the x, y, z, w coordinates, color, shading, and texture values for a control point of the stored patch. The next sixteen address locations each provide secondary w coordinate, color, and texture values for the patch control points.

Figure 17:
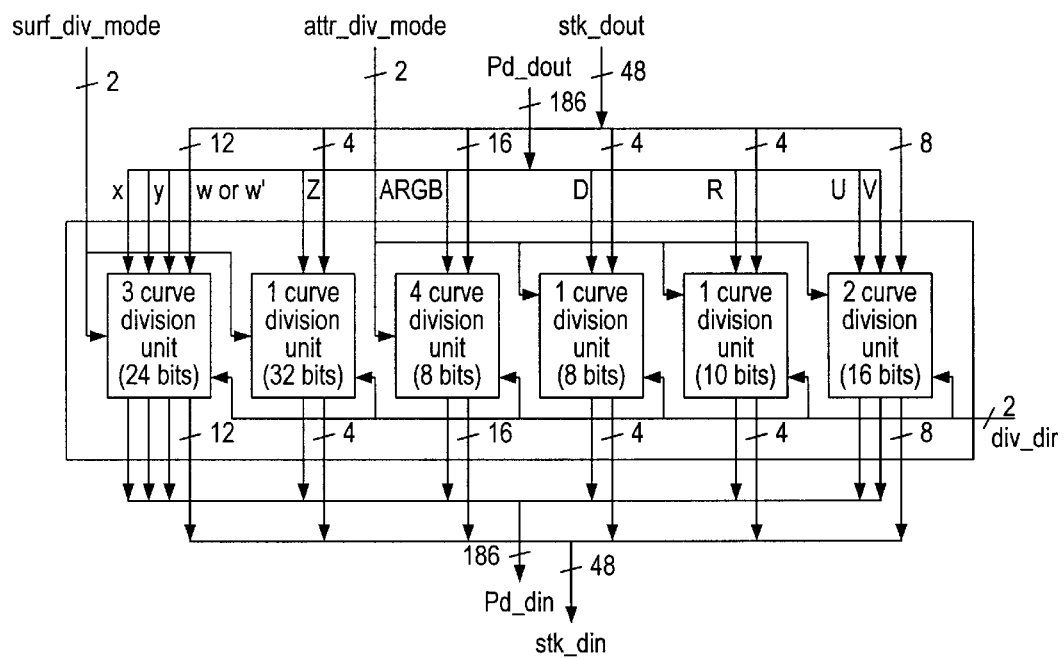
FIG. 17 illustrates the configuration of a patch division unit.

Referring now to FIG. 17, a block diagram of the patch division unit 304 is shown. Patch division unit 304 comprises twelve curve division units. The resolution of the curve division units varies. The X, Y and W curve division units each have 24 bit resolution, the Z curve division unit has 32 bit resolution, the R (red), G, B, A, and D curve division units each have 8 bit resolution, the R (reflectance) curve division unit has 10 bit resolution, and the U and V curve division units each have 16 bit resolution. The curve division units each receive their corresponding component of the control points. The curve division units are pipelined, so that one control point at a time is retrieved and one control point at a time is computed. Each of the curve division units consists of three adders and four registers $l_0, l_1, l_2,$ and $l_3$, of size S+3 where S is the size (bit resolution) of the input component. Inputs to a curve-division unit are a control point component $P_i$ (S bits long) from the PB_DOUT signal and 4-bit precision data $b_i$, $0<=i<=3$, from the STK_DOUT signal, where i represents the control point number. The output of the curve division units is the contents of the $l_0$ register, which is split to form newly calculated control point components and precision data. The newly calculated control point components are combined to form the PB_DIN signal, and the new precision data forms the STK_DIN signal. The STK_DOUT and STK_DIN signals are respectively retrieved from and provided to the stack 306.

For computation of the left child patch, the bit representation of the control point component is Pi with three appended zero-value least significant bits. For computation of the right sibling and parent patches, the bit representation is Pi with three appended precision bits and with the sign bit replaced with the sign bit from the precision data. In the table, these modified inputs are designated by Pi'. The computations of the curve division units are controlled by the SURF_DIV_MODE, ATTRIB_DIV_MODE, and DIV_DIR signals.

The DIV_DIR signal is used to indicate the type of computation, i.e. left child, right sibling, or parent patch. A fourth possibility is a pass-through operation, in which the output is equal to the input. The DIV_MODE signals are used to indicate which control point is being provided, i.e. the first, second, third, or fourth control point on the curve. In response to the control signals, the curve division units perform the following, calculations:

| div_dir | div_mode | Computations |
|---|---|---|
| pass through | first point | $l_0 = P'_0$ |
| | second point | $l_0 = P'_1$ |
| | third point | $l_0 = P'_2$ |
| | fourth point | $l_0 = P'_3$ |
| left child | first point | $l_0 = l_1 = l_2 = l_3 = p'_0$ |
| | second point | $l_0 = \dfrac{(l_1 + p'_1)}{2}, l_1 = \dfrac{l_2 + 2 \cdot p'_1}{4}, l_2 = \dfrac{l_3 + 3 \cdot p'_1}{8}$ |
| | third point | $l_0 = \left(l_1 + \dfrac{p'_2}{4}\right), l_1 = l_2 + \dfrac{3 \cdot p'_2}{8}$ |
| | fourth point | $l_0 = l_1 + \dfrac{p'_3}{8}$ |
| right sibling | first point | $l_0 = l_1 = l_2 = l_3 = p'_3$ |
| | second point | $l_0 = (2 \cdot l_1 - p'_2), l_1 = 4 \cdot (l_2 - p'_2), l_2 = 4 \cdot (2 \cdot l_3 - 3 \cdot p'_2)$ |
| | third point | $l_0 = (l_1 + p'_1), l_1 = l_2 + 6 \cdot p'_1$ |
| | fourth point | $l_0 = l_1 - p'_0$ |
| parent | first point | $l_0 = l_1 = l_2 = l_3 = p'_3$ |
| | second point | $l_0 = (2 \cdot p'_2 - l_1), l_1 = l_2 - 4 \cdot p'_2, l_2 = -l_3 + 6 \cdot p'_2$ |
| | third point | $l_0 = (l_1 + 4 \cdot p'_1), l_1 = l_2 - 12 \cdot p'_1$ |
| | fourth point | $l_0 = l_1 + 8 \cdot p'_0$ |

The control points are provided and calculated in the following orders:

| div_dir | Input order | output order |
|---|---|---|
| pass through | $(p_0, p_1, p_2, p_3)$ | $(p_0, p_1, p_2, p_3)$ |
| left child | $(p_0, p_1, p_2, p_3)$ | $(p_0, p_1, p_2, p_3)$ |
| right sibling | $(p_3, p_2, p_1, p_0)$ | $(p_0, p_1, p_2, p_3)$ |
| parent | $(p_3, p_2, p_1, p_0)$ | $(p_3, p_2, p_1, p_0)$ |

Figure 18:
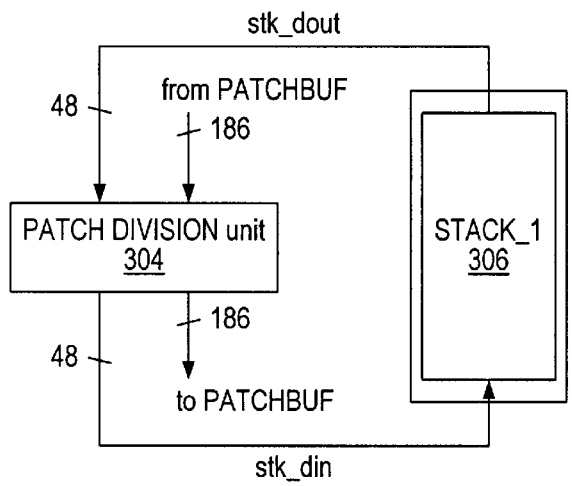
FIG. 18 illustrates the interface of the patch division unit.

As mentioned earlier, 4, 3, 2, 1 precision bits are stored for control points $p_3$, $p_2$, $p_1$, $p_0$, respectively, after a left child or right sibling computation. Each of these precision bits segment is made 4 bits long by appending 0,1,2,3 zero-valued least significant bits, respectively. Therefore the input to the patch-division unit which consists of 12 curve division units is 4×12=48 bits precision bits. For the four control points in a curve, these precision bits are stored in a sub-block of four 48-bits words in stack_1 of stack element 306. For left child computation, output precision bits for $p_0,p_1,p_2,p_3$ are stored into first, second, third and fourth words, respectively, of a sub-block. For a right sibling computation, the order in which words of a sub-block corresponding to a curve are accessed, is fourth, third, second and first. The precision bits for new control points $p_0,p_1,p_2,p_3$ resulting from the right sibling computation are stored in fourth, third, second and first words, respectively, of sub-block. For a parent computation, the words of a sub-block corresponding to a curve are accessed in the order of first, second, third and fourth corresponding to control points $p_3,p_2,p_1,p_0$, respectively, and the output precision bits are discarded. The overall configuration of patch division unit and stack_1 is shown in FIG. 18.

Stack_1 has a depth measured in blocks, where each block holds eight sub-blocks. Each sub-block holds the precision bits for one curve, and each patch has four curves of coordinates and primary attributes and four curves of secondary attributes. A stack depth of 10 blocks allows partitioning depth of 10 sub-divisions. Stack_1 has a separate read and write port, which are required by the overlapped reading and writing that occurs during a right-sibling computation. For a left child computation, a block of precision bits is written to the stack, and the stack counter is incremented. For a right sibling computation, a block of precision bits is read from the stack, and a block is written to the stack, so the stack counter doesn't change. For a parent computation the stack counter is decremented after a block of precision bits is read from the stack.

Figure 19:
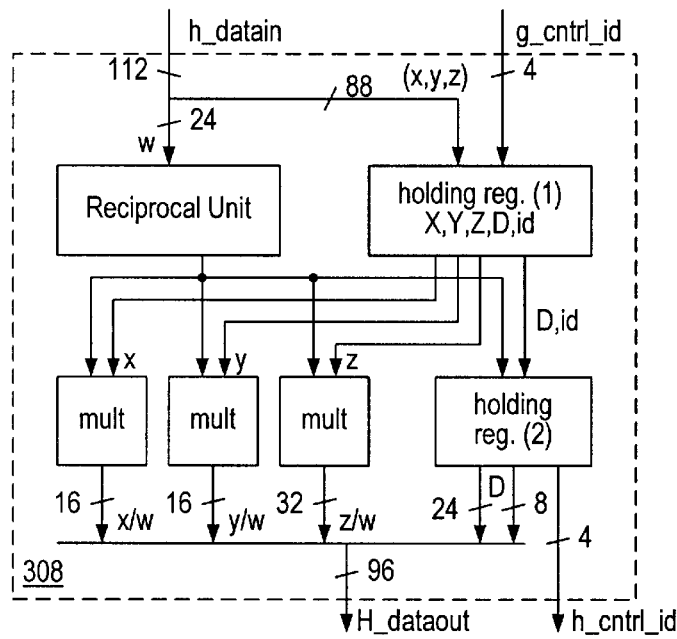
FIG. 19 is a block diagram of a homogeneous coordinate unit.

Referring now to FIG. 19, a block diagram of H-unit 308 is shown. H-unit 308 receives an H_DATA_IN signal and a G_CNTRL_ID signal, and produces an H_DATA_OUT signal and an H_CNTRL_ID signal. The H_DATA_IN signal includes the X,Y,Z,W and D components of a control point. The G_CNTRL_ID signal specifies the s and t position of the control point. The H-unit 308 includes a reciprocal unit which receives the W component of the control point and calculates the value of 1/W. H-unit 308 also includes a first holding register for storing the X, Y, Z, D and G_CNTRL_ID signal while the reciprocal unit operates. The first holding register provides the stored values in synchronization with the completion of the reciprocal calculation. H-unit 308 also includes three multipliers and a second holding register. The first, second, and third multipliers receive the X, Y, and Z components, respectively, from the first holding register, and multiply them by 1/W to produce X/W, Y/W, and Z/W. The second holding register receives the 1/W, D, and CNTRL_ID signals, and stores them while the multipliers operate. The stored values are released in synchronization with the completion of the multiply operation. The X/W, Y/W, Z/W, 1/W, and D signals combine to form the H_DATA_OUT signal, and the CNTRL_ID signal is provided as H_CNTRL_ID. Note that the D and CNTRL_ID signals have propagated through the H-unit 308 in synchronization with the other control point components, but otherwise without any processing.

Figure 20:
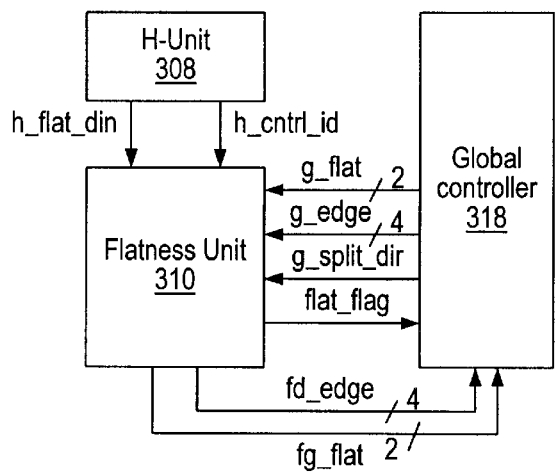
FIG. 20 illustrates the interface of a flatness test unit.

Referring now to FIG. 20, inputs and outputs of the flatness unit 310 is shown. Flatness unit 310 receives the H_DATA_OUT signal having the homogeneous coordinates of the patch control points and the H_CNTRL_ID signal specifying the control point position. The global controller 318 also provides signals to the flatness unit 310 including G_SPLIT_DIR indicating the direction of the subdivision performed by the patch division unit 304, G_EDGE indicating the edge flatness history, and G_FLAT indicating the direction flatness history. The edge history and the direction history are retrieved from a stack where the global controller has stored previous test results. The edge flatness signal is as described in FIG. 12, and is used by the flatness unit 310 to reduce the number of curves that need to be tested for a subpatch. The direction history signal similarly indicates if a patch's parent has ever tested flat in either the s or t direction, and is also used by the flatness unit 310 to reduce the number of curves to be tested for a subpatch. Flatness unit 310 provides a FLAT_FLAG signal indicating if the current patch has tested flat, an FG_EGDE signal indicating the straightness of the edges, and an FG_FLAT signal indicating the patch flatness in the s and t directions.

Figure 21A:
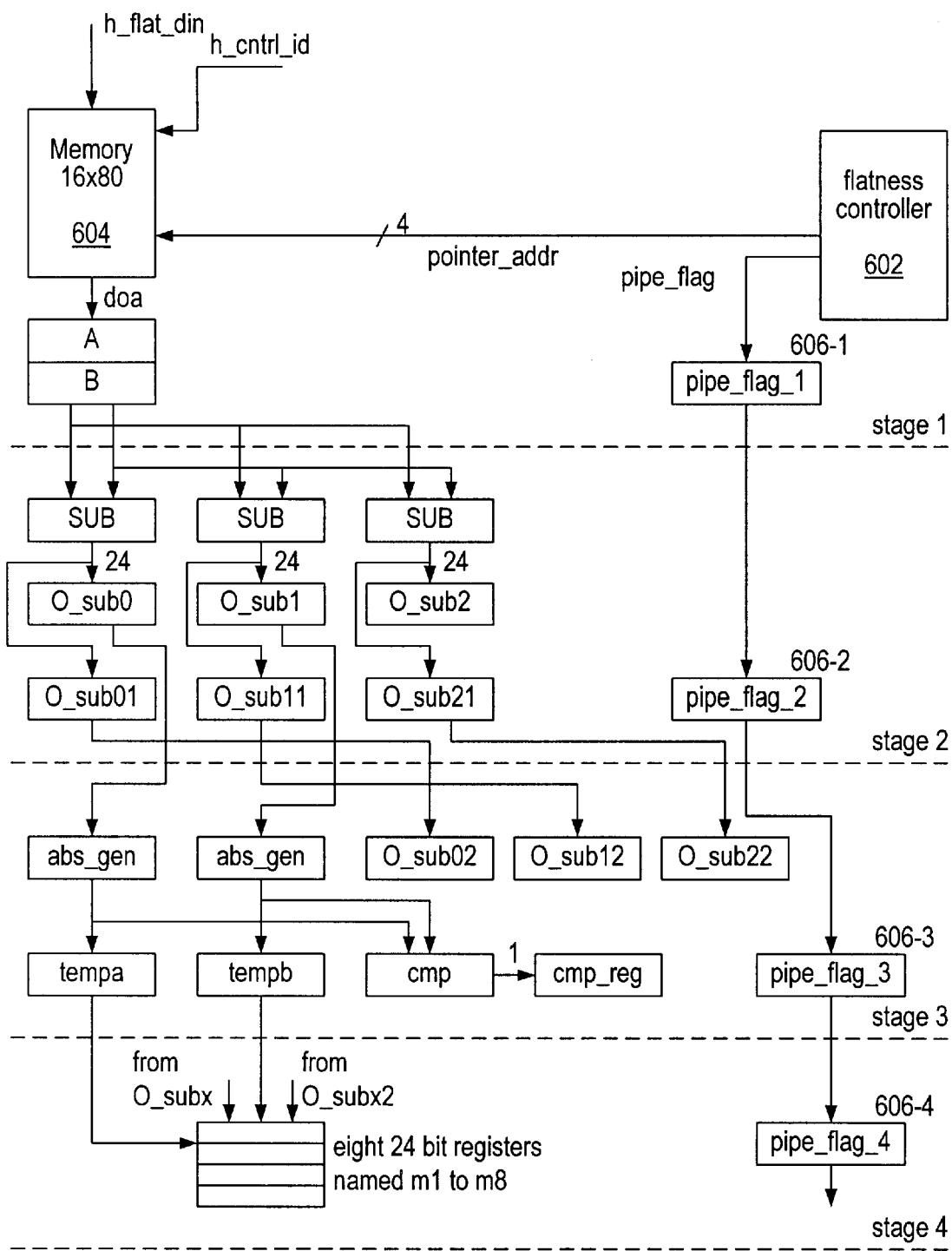
FIG. 21A is a block diagram of a flatness test unit.
Figure 21B:
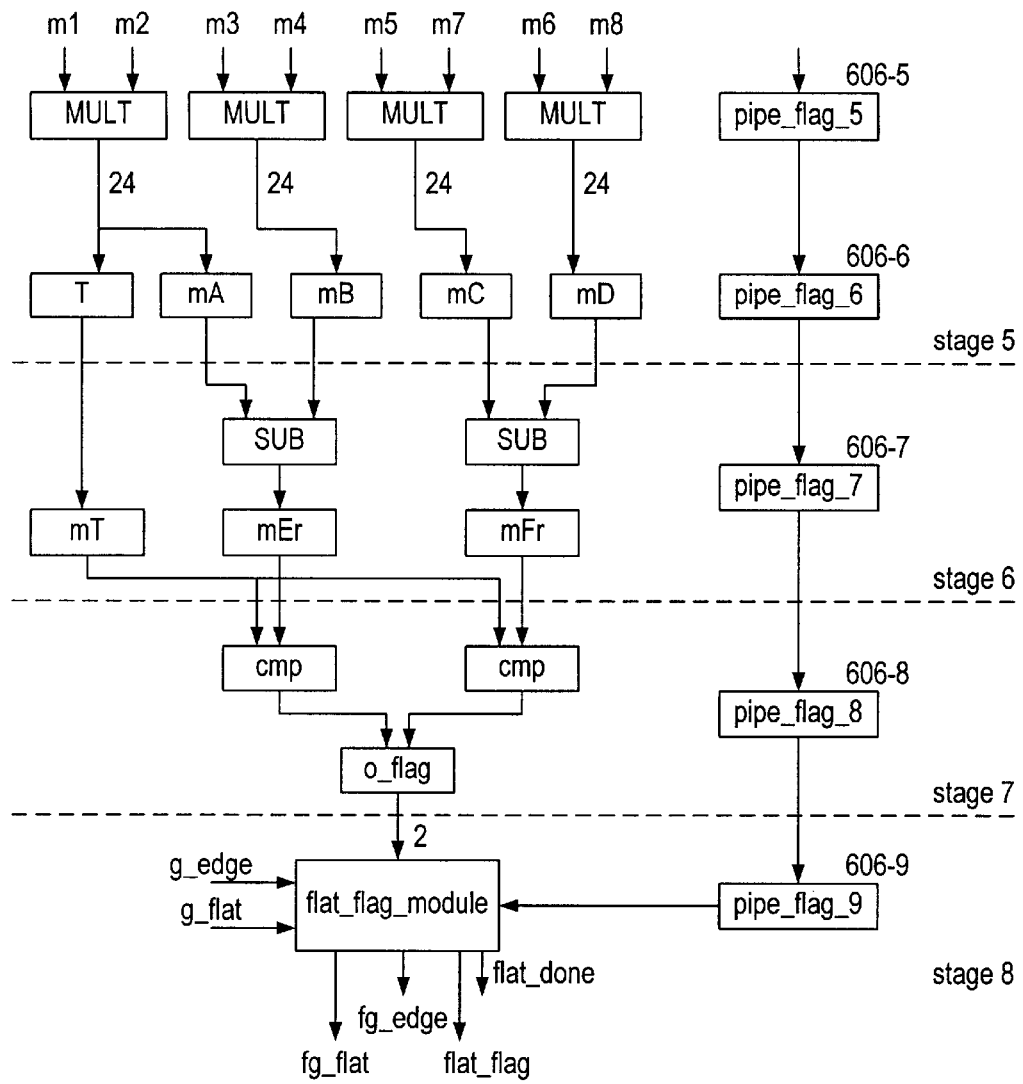
FIG. 21B is a block diagram of a flatness test unit.

FIGS. 21A and 21B show a block diagram of the flatness unit 310. During operation, a flatness controller 602 generates control signals which direct the operation of the other components. Coordinates of patch control points are stored in memory locations in buffer 604 according to their positions. The flatness controller 602 then causes the coordinates to be fed into the data pipeline in a desired order, while feeding control flags into a series of pipeline flag registers 606 to govern the operation of the subsequent pipeline stages. The control flags indicate the curve type (edge or internal), the edge number (first or second), the curve direction (s or t), the position of the control point on the curve (first, last, second, or third), flatness test type (coordinate or shading), and a reset flag.

The first stage of the flatness unit 310 includes origin coordinate register A which is used to store the coordinates of the first control point on a curve, and subsequent coordinate register B which is used to store the coordinates of the subsequent control points on the curve. Differences between the x,y and z coordinates (or x, y, and d coordinates for shading linearity) are determined by three subtraction units in stage 2. The outputs of the subtraction units are stored in curve-run registers O_SUB0, O_SUB1, and O_SUB2 when the differences between the first and last control point coordinates are calculated, and stored in the intermediate-run registers O_SUB01, O_SUB11, and O_SUB21 when the differences between the first and intermediate control point coordinates are calculated. In stage 3, two absolute value units determine the absolute values of the contents of the curve-run registers O_SUB0 and O_SUB1, and a comparator determines which of the absolute values is largest. Also in stage 3, buffering registers TEMPA, TEMPB, O_SUB02, O_SUB 12 and O_SUB22 are used to buffer the calculated absolute values and the contents of the intermediate-run registers of stage 2.

In stage 4, a logic circuit is used to store multiplicand values in multiplicand registers M1–M8, which will be used pairwise to determine products in stage 5. multiplicand registers M1 and M2 serve a dual function storing first a curve-run coordinate difference and a tolerance, respectively, then storing an intermediate-run coordinate difference and a curve-run coordinate difference, respectively. The other multiplicand registers pairwise (i.e. M3 and M4, M5 and M6, M7 and M8) store an intermediate-run coordinate difference and a curve-run coordinate difference. In stage 5, four multipliers multiply the contents of the multiplicand registers pairwise, and store the results in tolerance buffer T and product buffers MA, MB, MC, and MD. The tolerance buffer T stores the first product of M1*M2, and the product buffer MA stores subsequent products of M1*M2. The product buffers MB, MC, and MD store the products M3*M4, M5*M6, and M7*M8.

In stage 6, subtraction units find the differences MA-MB and MC-MD and store them in the difference buffers MER and MFR. The contents of the tolerance buffer T are copied into a second tolerance buffer MT. In stage 7, the tolerance buffer MT is compared to the difference buffers MER and MFR by two comparators, and if the contents of the difference buffers are both less than the tolerance, a flatness flag is asserted and stored in an O_FLAG buffer. The status of the O_FLAG buffer is monitored by a FLAT_FLAG module in stage 8 to determine if the patch edges and internal curves are straight, and thereby determine the overall patch flatness The FLAT_FLAG module sets bits in the FG_EDGE signal, the FG_FLAT signal, and asserts or deasserts the overall patch flatness signal FLAT_FLAG.

Figure 22:
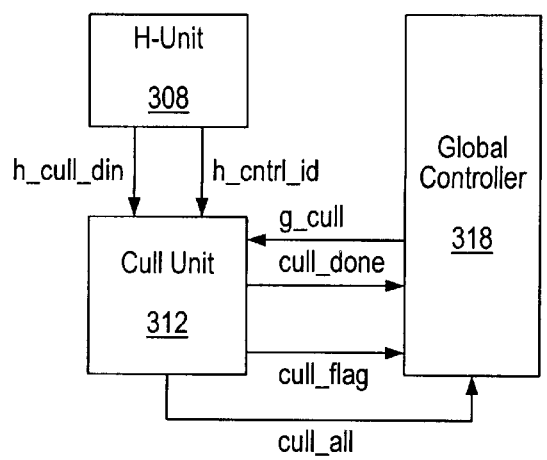
FIG. 22 illustrates the interface of a cull unit.

Referring now to FIG. 22, inputs and outputs of the cull unit 312 are shown. Cull unit 312 receives an H_CULL_DIN signal having the X/W and Y/W coordinates of control points and an H_CNTRL_ID signal specifying the control point position. Cull unit 312 also receives a G_CULL signal for requesting a cull test on the current patch. Cull unit 312 provides a CULL_DONE signal indicating when the cull test has been completed for the current patch, and a CULL_FLAG signal indicating when the current patch is backfaced. Cull unit 312 also provides a CULL_ALL signal indicating if the whole patch has the same backface status.

Figure 23:
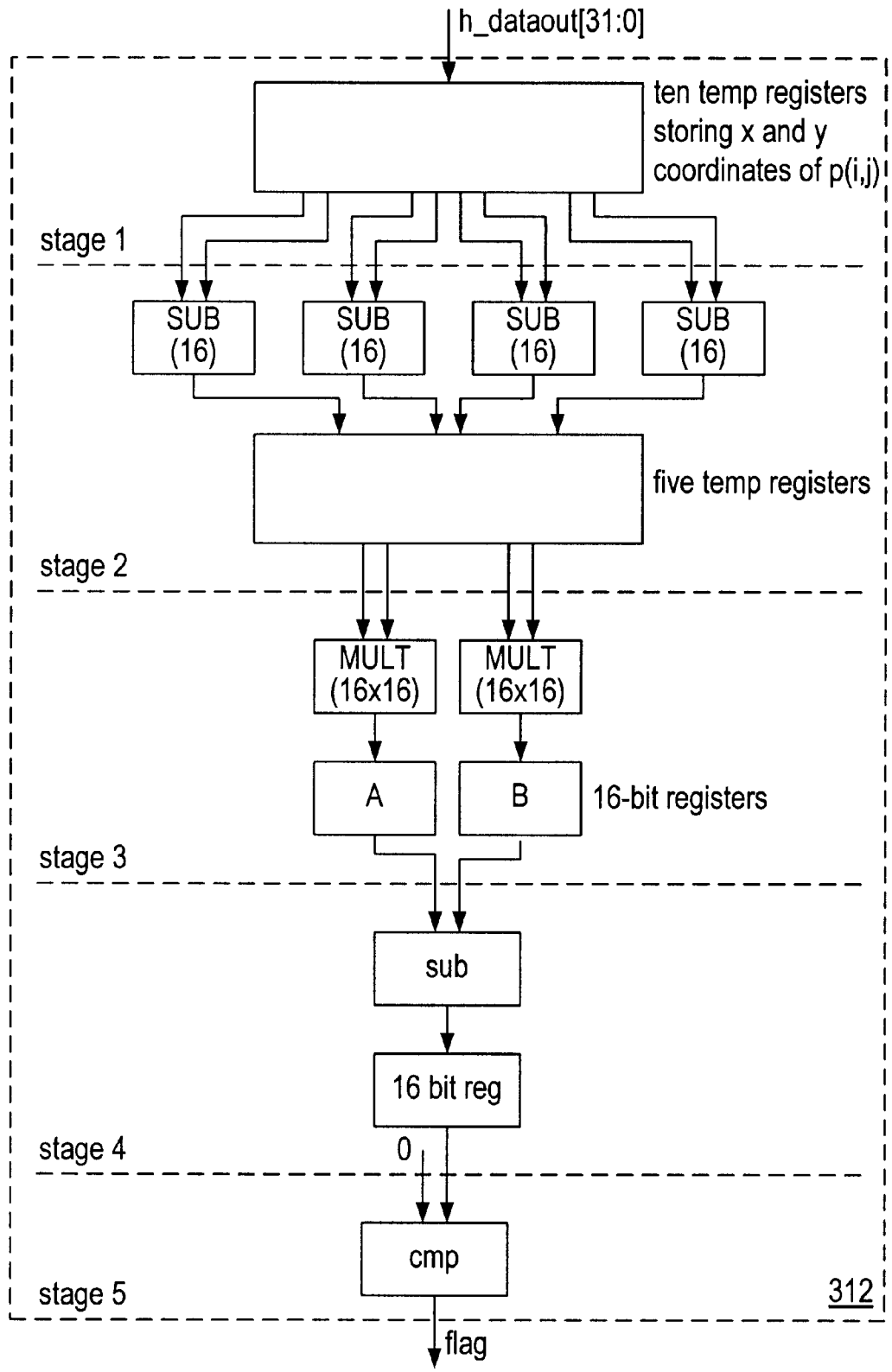
FIG. 23 is a block diagram of a cull unit.

FIG. 23 shows a functional block diagram of the cull unit 312. In stage 1, a set of ten temporary registers store the control point coordinates. In stage 2, two pairs of subtraction units each find the differences between the x and y coordinates of two control points, and the resulting vectors are stored in a set of five temporary registers. In stage 3, two multipliers cross-multiply the x and y coordinates of the vectors, and store the results in the A and B registers. In stage 4, the difference between the A and B registers is calculated by a subtraction unit to yield a cross product of two vectors. In stage 5, the sign of the cross product is used to determine whether a portion of the current patch is backfaced.

Figures 24, 25:
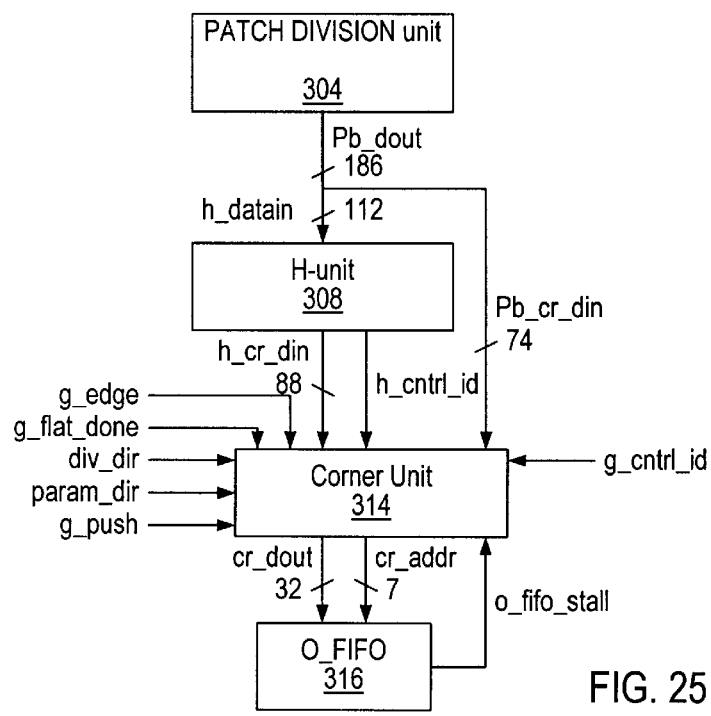
FIG. 24 is a scheduling table for operations in the cull unit.
FIG. 25 illustrates the interface of a corner unit.

One scheduling for the computations of cull unit 312 is shown in FIG. 24. The ordered pair (i,j), 0<=i,j<=3, indicates the position of the control point in the s and t directions. The stage 1 column indicates the loading of the registers, the stage 2 column indicates the operation of the subtraction units and the storing of the results in temporary registers. The stage 3 column indicates the operation of the multiplication units and storing of the results in the A and B registers. The stage 4 column indicates the operation of the sub tract ion unit and storage in a temporary register, and the stage 5 column indicates the operation of the comparator. It takes 25 cycles for full cull test, i.e. to test all the control points for culling. In general, about half of the point will be tested for culling before a patch is turned out to be undecided about culling, i.e at least one control point satisfy cull test and at least one point does not. Therefore, on average it takes about 17 cycles for culling test.

Turning now to FIG. 25, the interface signals for the corner unit 314 are shown. The primary function of the corner unit 314 is to store the homogeneous coordinates and attributes of the corner points of subpatches in preparation for providing them as vertices of output triangles. The corner unit 314 also provides a secondary function of re-calculating corner points for subpatches having "straight" edges using the straight-edge algorithm described previously. By enforcing the straightness of "straight" edges in this manner, the edges of neighboring patches are prevented from developing gaps between them.

Corner unit 314 receives a G_EDGE signal indicating which edges of the current patch are "straight", a G_FLAT_DONE signal indicating when the flatness test of the current patch is complete, a DIV_DIR signal indicating whether the current computation is a pass through, left child, right sibling, or parent computation, a PARAM_DIR signal indicating which direction the sub-patch is being divided in, and a G_PUSH signal for requesting that the current patch be pushed onto the output FIFO. The corner unit 314 also receives a H_CR_DIN signal and a H_CNTRL_ID signal specifying the homogeneous coordinates and position, respectively, of a control point. A PB_CR_DIN signal and G_CNTRL_ID signal similarly specifies the attributes and position, respectively, of a control point. The corner unit 314 provides a CR_DOUT and CR_ADDR signal indicating data and an address for a control point to the OFIFO buffer 316, taking into account an OFIFO_STALL signal which indicates if the OFIFO buffer 316 is full.

Figure 26:
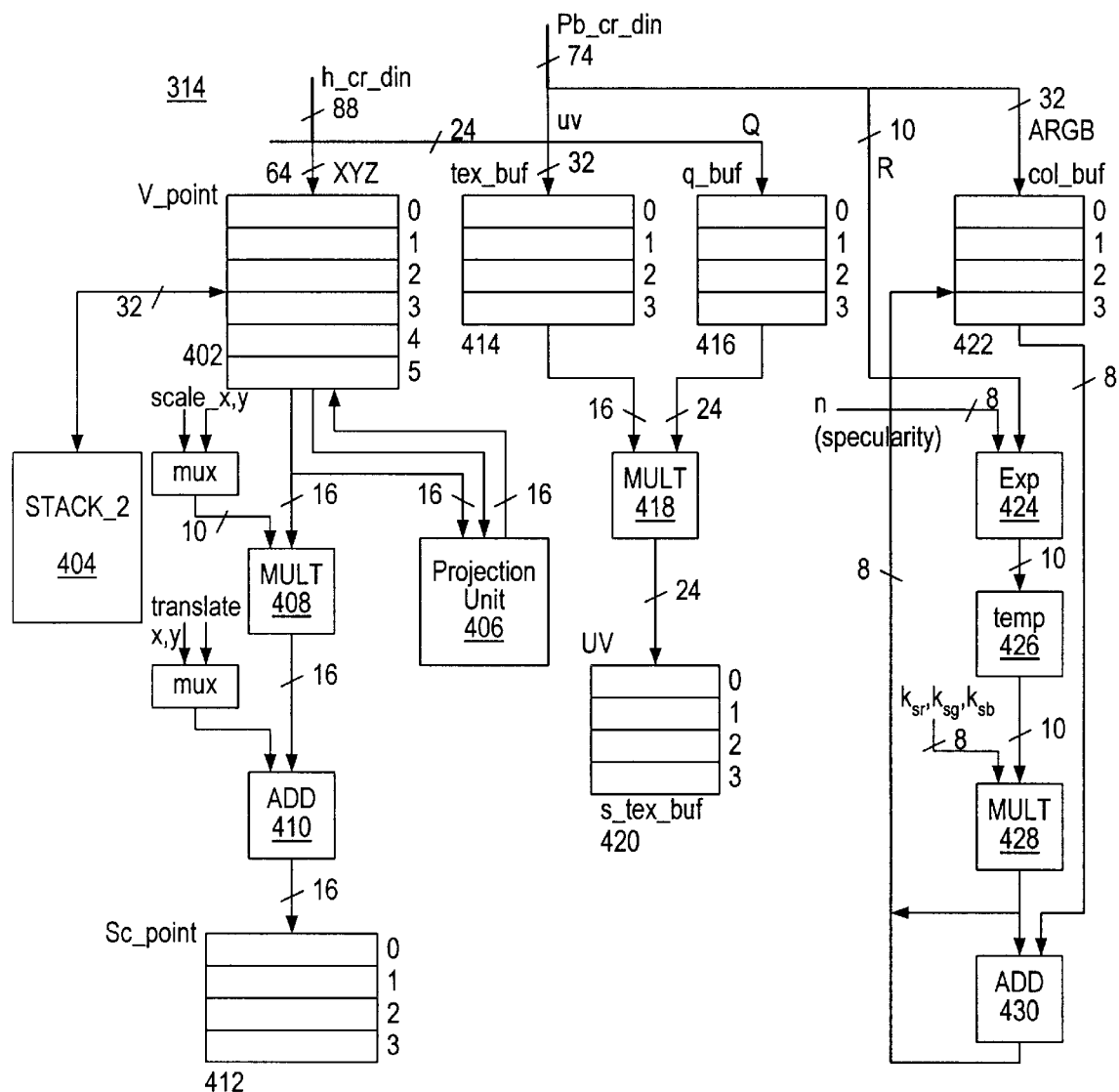
FIG. 26 is a block diagram of a corner unit.

When a pass through, left child, or right sibling computation is executed by the patch division unit 304, the corner unit 314 stores the attributes of all four corner points of the current patch. The homogeneous coordinates of the four corner points from the H-unit 308 are stored by the corner unit 314 during a pass through operation only. For a left child operation, the homogeneous coordinates of the two new corner points are stored. For a right sibling or parent computation, the coordinates of corner points are not stored by the corner unit 314. FIG. 26, shows a functional block diagram of corner unit 314. The homogeneous coordinates of the corner points are stored in vertex point buffer 402. Vertex point buffer 402 holds six corner coordinates (X,Y,Z) in viewing space, i.e. $-1<=X,Y<=1$, and $-1<=Z<=0$. Two corner coordinate storage registers are use temporary registers. During pass through computations, the first four storage registers of the vertex point buffer are used to hold the coordinates of the four corner points. During left child computations, the fifth and sixth storage registers are used to hold the coordinates of the two new corner points. During right sibling and parent computations, the fifth and sixth storage registers are used to hold previously-computed coordinates of two corner points which are retrieved from the stack 404.

Figure 27:
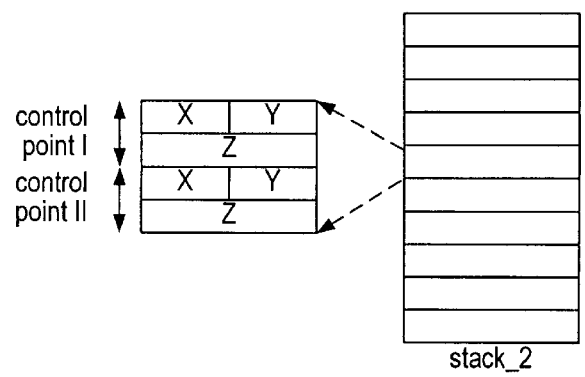
FIG. 27 illustrates the configuration of a stack.

If, during a left child operation, patch is being divided across one or more edges which have been classified as straight, then the projection unit 406 recomputes the coordinates of the new corner(s) using the appropriate stored values from the first four vertex point buffer registers and stores the result in the corresponding fifth and/or sixth register. After any necessary re-computations, the coordinates in the vertex point buffer 402 are subjected to a swapping operation. The operation is based on the computation type (left child, right sibling, or parent) and the subdivision direction (s or t), and the effect of the swapping operation is to move the coordinates of the corners of the current subpatch into the lower four registers and the "extra" two corners into the fifth and sixth registers. If the operation is a left child or right sibling operation, then the contents of the fifth and sixth registers will be stored in the stack 404. Turning momentarily to FIG. 27, the configuration of stack 404 is shown. Stack 404 stores (x,y,z) coordinates of two corners of a patch in one block. In one embodiment, the stack consists of 10 blocks, each with four 32-bits words. Stack 404 may be implemented as a buffer with a single read/write port.

Returning to FIG. 26, before the coordinates stored in the first four registers of the vertex point register are pushed into the OFIFO buffer 316, they are first scaled using multiplier 408 and translated using adder 410. The scaled and translated coordinates are stored in the scaled coordinate point buffer 412.

The corner unit 314 also includes texture buffer 414, Q buffer 416, and color buffer 422. In one embodiment, each of these buffers includes 8 words. Perspective correction of the texture coordinates u,v is provided by multiplier 418 which multiplies the u and v coordinates with the corresponding Q (=1/W) factor and stores the results in the scaled texture buffer 420. Corner unit 314 includes a exponentiation unit 424, a temporary register 426, a multiplier 428, and an adder 430 for computing specular colors and adding them to the primary and/or secondary colors. If desired, the calculated specular color may simply be stored as the secondary color.

The attribute computations are performed in parallel with corner computation. If during attribute computation a patch is determined to be not flat, the attribute computation is cancelled while the corner coordinate computation is continued. If corner coordinates computations are completed and the patch is subsequently determined to be not flat, the operation of scaling and translating corner coordinates is cancelled. If a patch is determined to be flat, the global controller 318 sends the G_PUSH signal to corner unit 314. The corner unit 314 starts pushing the computed attributes and corner coordinates of patch one by one. If the OFIFO buffer 316 is indicating a stall, the push operation is delayed. After the corner attributes of a triangle in a quadrilateral have been loaded into the OFIFO buffer 316, they are followed by a raster command. The appropriate addresses for the data and commands are generated by the corner unit 314 as it sends data to the OFIFO buffer 316. The second triangle in the quadrilateral is generated by sending the fourth vertex point into the OFIFO buffer followed by a slightly different raster command. If the next computation is a right sibling computation, this computation may be stalled until the corner unit completes pushing the vertices into the OFIFO buffer. However, a parent computation is not required to stall. In this case, the old corner coordinates are stored in the scaled point buffer.

Figures 28, 29:
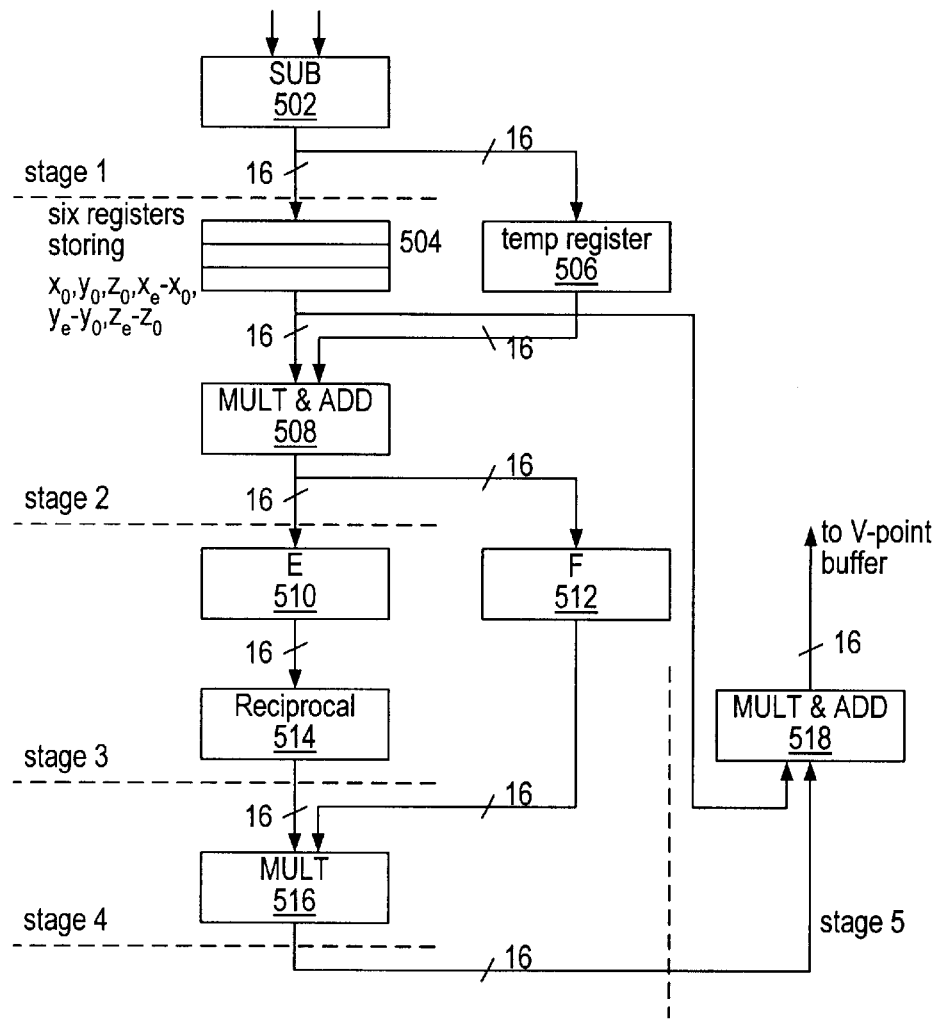
FIG. 28 is a block diagram of a projection unit.
FIG. 29 is a scheduling table for operations in the projection unit.

Turning now to FIG. 28, a block diagram of projection unit 406 is shown. Subtraction unit 502 calculates the differences between the x,y, and z coordinates of the end points of the patch edge, and stores the results in buffer 504. As the results are stored in buffer 504, they are squared and accumulated in register 510 by multiplication and addition unit 508. Subtraction unit 502 also calculates the differences between the x,y, and z coordinates of an endpoint and the mid-point of the patch edge, and stores the results in temporary register 506. As these results are stored, multiplication and addition unit 508 multiplies them by the corresponding differences stored in buffer 504 and accumulated in register 512. During this time, reciprocal unit 514 calculates the reciprocal of register 514. The contents of register 512 are multiplied by this reciprocal by multiplier 516.This result is multiplied with the differences stored in buffer 504 and added to the end point x,y, and z coordinates by multiplication and addition unit 518, and subsequently stored in vertex point buffer 402. FIG. 29 shows the scheduling of the operations of each of the stages.

The described invention advantageously renders rational bicubic Bezier patches. This system allows input data-base to be represented in as a set of Bezier patches, thereby reducing the size of data base, and it can compute specular colors for patch. This system adaptively tessellates a Bezier patch into a set of triangles for a given viewing direction, (i.e. a zoomed in patch is tessellated into more triangles than a far-away patch), but it also allows for fixed tessellation of patches. Also, edge and shading smoothness are ensured, thereby providing high quality image reproduction.

Numerous variations and modifications will become apparent to those skilled in the art once the above disclosure is fully appreciated. It is intended that the following claims be interpreted to embrace all such variations and modifications.

What is claimed is:

1. A patch tessellation device for converting a Bezier surface patch having a set of control points to a plurality of triangles for display, wherein the patch tessellation device includes a corner unit configured to provide output coordinates and attributes for corner points of a subpatch, wherein the corner unit comprises:

a vertex buffer configured to store spatial coordinates of two pairs of current corner points of a current surface patch, wherein the vertex buffer is further configured to receive spatial coordinates of two new corner points on respective patch edges between the pairs of current corner points during a patch subdivision operation;

a projection unit coupled to receive the spatial coordinates of one pair of the two pairs of current corner points and the spatial coordinates of a corresponding one of the two new corner points, wherein the projection unit is configured to responsively calculate and store in the vertex buffer spatial coordinates of a projected corner point on a line between the one pair of current corner points only if the patch edge between the one pair of current corner points is classified as straight;

a stack coupled to the vertex buffer and configured to store spatial coordinates of a first current corner point from each pair of current corner points after the patch subdivision operation;

a multiplier coupled to the vertex buffer and configured to multiply spatial coordinates of the new corner points and a second current corner point from each pair of current corner points by X- and Y-coordinate scale factors to form scaled coordinates for said new and second current corner points if the subpatch having said new and second current corner points is classified as flat;

an adder coupled to receive the scaled coordinates from the multiplier and configured to add X- and Y-coordinate translation factors to the scaled coordinates to form the output coordinates for said new and second current corner points; and an output buffer coupled to receive the output coordinates from the adder.

2. The patch tessellation device of claim 1, wherein the spatial coordinates of the one pair of current corner points are $(x_0,y_0,z_0)$ and $(x_e,y_e,z_e)$, wherein the spatial coordinates of the corresponding one new corner point are $(x_1,y_1,z_1)$, wherein the spatial coordinates of the projected corner point are $(x_m,y_m,z_m)$, and wherein the projection unit comprises:

a subtraction unit for computing the differences $D_1=(x_e-x_0)$, $D_2=(y_e-y_0)$, $D_3=(z_e-z_0)$, $D_4=(x_1-x_0)$, $D_5=(y_1-y_0)$, and $D_6=(z_1-z_0)$;

a multiplication and addition unit for computing the sums $S_1=D_1^2+D_2^2+D_3^2$ and $S_2=D_1D_4+D_2D_5+D_3D_6$;

a reciprocal unit for computing the reciprocal $R=1/S_1$;

a second multiplication unit for computing the product $P=S_2R$; and a second multiplication and addition unit for computing the spatial coordinates $x_m = x_0 + D_1 P$, $y_m = y_0 + D_2 P$, and $z_m = z_0 + D_3 P$.

3. The patch tessellation device of claim 1, wherein the corner unit further comprises:

a texture buffer configured to receive texture coordinates for four new corner points of the subpatch;

a compensation buffer configured to receive compensation factors for the four new corner points of the subpatch; and a texture multiplier coupled to the texture buffer and the compensation buffer and configured to multiply the texture coordinates with respective compensation factors to produce compensated texture coordinates;

wherein the output buffer is also coupled to receive the compensated texture coordinates from the texture multiplier.

4. The patch tessellation device of claim 1, further including:

a patch buffer configured to receive and store rational coordinates of the current control points of the current surface patch;

a patch division unit coupled to receive the rational coordinates of the current control points from the patch buffer and configured to calculate rational coordinates of new control points for a new surface patch; and a homogeneous coordinate unit coupled to receive the rational coordinates of the new control points and configured to convert the rational coordinates of the new control points to spatial coordinates of the new control points;

wherein the corner unit is coupled to the homogeneous coordinate unit to receive the spatial coordinates of the new control points which correspond to new corner points.

5. The patch tessellation device of claim 4, wherein the patch division unit is configured to provide the rational coordinates of the new control points for the new patch to the patch buffer as the rational coordinates of the current control points of the current surface patch.

6. The patch tessellation device of claim 4, further including:

a flatness unit coupled to the homogeneous coordinate unit to receive the spatial coordinates of the new control points, wherein the flatness unit is configured to responsively classify the straightness of the patch edges and determine the flatness of the new surface patch; and a cull unit coupled to the homogeneous coordinate unit to receive the spatial coordinates of the new control points, wherein the cull unit is configured to responsively determine if the new surface patch is backfaced.

7. The patch tessellation device of claim 4, wherein the corner unit is configured to provide the spatial coordinates of the corner points of the new surface patch to an output buffer if the new surface patch is determined to be flat by the flatness unit.

8. The patch tessellation device of claim 4, wherein the patch buffer is further configured to receive and store patch attribute coordinates of the current control points of the current surface patch, wherein the patch division unit is coupled to the patch buffer to receive the patch attribute coordinates of the current control points and configured to calculate new patch coordinates of the new control points for the new surface patch, and wherein the corner unit is coupled to the patch division unit to receive the patch attribute coordinates of the new control points which correspond to corner points of the new surface patch.

9. The patch tessellation device of claim 8, further including:

a flatness unit coupled to the homogeneous coordinate unit to receive the spatial coordinates and patch attribute coordinates of the new control points, wherein the flatness unit is configured to responsively classify the straightness of the patch edges and determine the flatness and linearity of shading of the new surface patch; and a cull unit coupled to the homogeneous coordinate unit to receive the spatial coordinates of the new control points, wherein the cull unit is configured to responsively determine if the new surface patch is backfaced.

10. The patch tessellation device of claim 9, wherein the corner unit is configured to provide the spatial coordinates of the corner points of the new surface patch to an output buffer if (a) the new surface patch is determined to be flat by the flatness unit, (b) the surface patch is determined to have linear shading by the flatness unit, and (c) the patch is determined to be not backfaced by the cull unit.

11. A patch tessellation device for converting a Bezier surface patch having a set of control points to a plurality of triangles for display, wherein the patch tessellation device comprises:

a patch buffer configured to receive and store rational coordinates of current control points of a current surface patch;

a patch division unit coupled to receive the rational coordinates of the current control points from the patch buffer and configured to calculate rational coordinates of new control points for a new surface patch;

a homogeneous coordinate unit coupled to receive the rational coordinates of the new control points and configured to convert the rational coordinates of the new control points to spatial coordinates of the new control points;

a corner unit coupled to the homogeneous coordinate unit to receive the spatial coordinates of new control points which correspond to corner points of the new surface patch, wherein the corner unit is configured to provide the spatial coordinates for corner points of the new surface patch to an output buffer if the new surface patch is classified as flat;

a flatness unit coupled to the homogeneous coordinate unit to receive the spatial coordinates of the new control points, wherein the flatness unit is configured to responsively determine the flatness of the new surface patch; and a cull unit coupled to the homogeneous coordinate unit to receive the spatial coordinates of the new control points, wherein the cull unit is configured to responsively determine if the new surface patch is backfaced.

12. The patch tessellation device of claim 11, wherein the patch buffer is further configured to receive and store patch attribute coordinates of the current control points, wherein the patch division unit is coupled to receive the patch attribute coordinates of the current control points from the patch buffer and configured to calculate patch attribute coordinates of the new control points, and wherein the corner unit is coupled to the patch division unit to receive the patch attribute coordinates of the new control points which correspond to the corner points of the new surface patch, and wherein the corner unit is further configured to provide the patch attribute coordinates with the spatial coordinates to the output buffer if the new surface patch is classified as flat.

13. The patch tessellation device of claim 11, wherein the patch division unit is configured to provide the rational coordinates of the new control points for the new patch to the patch buffer as the rational coordinates of the current control points of the current surface patch.

14. The patch tessellation device of claim 11, wherein the corner unit is configured to provide the spatial coordinates of the corner points of the new surface patch to an output buffer if the new surface patch is determined to be flat by the flatness unit and to be not-backfaced by the cull unit.

* * * * *